United States Patent
Goli et al.

(10) Patent No.: US 9,838,754 B2
(45) Date of Patent: Dec. 5, 2017

(54) ON-SITE MEASUREMENT OF OVER THE TOP MEDIA

(71) Applicant: The Nielsen Company (US), LLC, New York, NY (US)

(72) Inventors: Narasimha Reddy Goli, Tampa, FL (US); Gangadhar Jakkula, Tampa, FL (US); Matthew B. Reid, Alameda, CA (US); Kumar Nagaraja Rao, Fremont, CA (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 15/151,182

(22) Filed: May 10, 2016

(65) Prior Publication Data
US 2017/0064411 A1    Mar. 2, 2017

(30) Foreign Application Priority Data
Sep. 1, 2015 (IN) ............................ 2734/DEL/2015

(51) Int. Cl.
*H04N 21/81* (2011.01)
*H04N 21/466* (2011.01)
(Continued)

(52) U.S. Cl.
CPC ....... *H04N 21/812* (2013.01); *G06Q 30/0201* (2013.01); *G06Q 30/0272* (2013.01);
(Continued)

(58) Field of Classification Search
None
See application file for complete search history.

(56) References Cited

U.S. PATENT DOCUMENTS

| 4,658,290 A | 4/1987 | McKenna et al. |
| 5,584,050 A | 12/1996 | Lyons |

(Continued)

FOREIGN PATENT DOCUMENTS

| AU | 2013205736 | 5/2013 |
| CN | 1898662 | 1/2007 |

(Continued)

OTHER PUBLICATIONS

Albanesius, "Facebook Issues Fix for Several Tracking Cookies," Sep. 28, 2011 (2 pages).

(Continued)

*Primary Examiner* — Hoang-Vu A Nguyen-Ba
(74) *Attorney, Agent, or Firm* — Hanley, Flight & Zimmerman, LLC.

(57) ABSTRACT

Methods and apparatus for over the top (OTT) media measurement are disclosed herein. Example methods include comparing, with an on-site meter in communication with an OTT service provider server, household data maintained by the OTT service provider server with anonymized panelist data provided by an audience measurement entity to identify a first person predicted to be included in a first household according to the anonymized panelist data but not included in the first household according to the household data, accessing media impressions collected by the OTT service provider server and corresponding to media accessed with a first OTT device associated with the first household, and crediting, with the on-site meter, usage of the first OTT device associated with access of the media to the first person based on the media impressions and demographic data obtained from the anonymized panelist data and attributed to the first person.

18 Claims, 15 Drawing Sheets

(51) Int. Cl.
  *H04N 21/442* (2011.01)
  *G06Q 30/02* (2012.01)
  *H04N 21/61* (2011.01)
  *H04N 21/258* (2011.01)
  *H04N 21/45* (2011.01)

(52) U.S. Cl.
  CPC . *H04N 21/25883* (2013.01); *H04N 21/44204* (2013.01); *H04N 21/44222* (2013.01); *H04N 21/4532* (2013.01); *H04N 21/4661* (2013.01); *H04N 21/6125* (2013.01)

(56) References Cited

U.S. PATENT DOCUMENTS

| | | | |
|---|---|---|---|
| 5,594,934 | A | 1/1997 | Lu et al. |
| 5,675,510 | A | 10/1997 | Coffey et al. |
| 5,796,952 | A | 8/1998 | Davis et al. |
| 5,832,520 | A | 11/1998 | Miller |
| 5,848,396 | A | 12/1998 | Gerace |
| 5,870,740 | A | 2/1999 | Rose et al. |
| 5,948,061 | A | 9/1999 | Merriman et al. |
| 6,035,339 | A | 3/2000 | Agraharam et al. |
| 6,052,730 | A | 4/2000 | Felciano et al. |
| 6,055,573 | A | 4/2000 | Gardenswartz et al. |
| 6,098,093 | A | 8/2000 | Bayeh et al. |
| 6,102,406 | A | 8/2000 | Miles et al. |
| 6,108,637 | A | 8/2000 | Blumenau |
| 6,138,155 | A | 10/2000 | Davis et al. |
| 6,141,694 | A | 10/2000 | Gardner |
| 6,223,215 | B1 | 4/2001 | Hunt et al. |
| 6,279,036 | B1 | 8/2001 | Himmel et al. |
| 6,286,140 | B1 | 9/2001 | Ivanyi |
| 6,415,323 | B1 | 7/2002 | McCanne et al. |
| 6,434,614 | B1 | 8/2002 | Blumenau |
| 6,457,010 | B1 | 9/2002 | Eldering et al. |
| 6,460,079 | B1 | 10/2002 | Blumenau |
| 6,529,952 | B1 | 3/2003 | Blumenau |
| 6,606,657 | B1 | 8/2003 | Zilberstein et al. |
| 6,637,029 | B1* | 10/2003 | Maissel ............. H04N 5/44543 348/E5.105 |
| 6,658,410 | B1 | 12/2003 | Sakamaki et al. |
| 6,704,787 | B1 | 3/2004 | Umbreit |
| 6,714,917 | B1 | 3/2004 | Eldering et al. |
| 6,839,680 | B1 | 1/2005 | Liu et al. |
| 6,877,007 | B1 | 4/2005 | Hentzel et al. |
| 6,993,590 | B1 | 1/2006 | Gauthier et al. |
| 7,039,699 | B1 | 5/2006 | Narin et al. |
| 7,092,926 | B2 | 8/2006 | Cerrato |
| 7,139,723 | B2 | 11/2006 | Conkwright et al. |
| 7,146,329 | B2 | 12/2006 | Conkwright et al. |
| 7,150,030 | B1 | 12/2006 | Eldering et al. |
| 7,152,074 | B2 | 12/2006 | Dettinger et al. |
| 7,159,023 | B2 | 1/2007 | Tufts |
| 7,181,412 | B1 | 2/2007 | Fulgoni et al. |
| 7,260,837 | B2 | 8/2007 | Abraham et al. |
| 7,272,617 | B1 | 9/2007 | Bayer et al. |
| 7,302,447 | B2 | 11/2007 | Dettinger et al. |
| 7,343,417 | B2 | 3/2008 | Baum |
| 7,363,643 | B2 | 4/2008 | Drake et al. |
| 7,386,473 | B2 | 6/2008 | Blumenau |
| 7,406,516 | B2 | 7/2008 | Davis et al. |
| 7,546,370 | B1 | 6/2009 | Acharya et al. |
| 7,590,568 | B2 | 9/2009 | Blumenau |
| 7,613,635 | B2 | 11/2009 | Blumenau |
| 7,634,786 | B2 | 12/2009 | Knee et al. |
| 7,644,156 | B2 | 1/2010 | Blumenau |
| 7,647,418 | B2 | 1/2010 | Ash et al. |
| 7,650,407 | B2 | 1/2010 | Blumenau |
| 7,653,724 | B2 | 1/2010 | Blumenau |
| 7,716,326 | B2 | 5/2010 | Blumenau |
| 7,720,963 | B2 | 5/2010 | Blumenau |
| 7,720,964 | B2 | 5/2010 | Blumenau |
| 7,743,394 | B2* | 6/2010 | Smith ............. G06Q 30/02 725/13 |
| 7,756,974 | B2 | 7/2010 | Blumenau |
| 7,788,216 | B2 | 8/2010 | Li et al. |
| 7,853,969 | B2* | 12/2010 | Smith ............. G06Q 30/02 705/14.41 |
| 7,882,054 | B2 | 2/2011 | Levitan |
| 7,882,242 | B2 | 2/2011 | Chen |
| 7,890,451 | B2 | 2/2011 | Cancel et al. |
| 7,925,694 | B2 | 4/2011 | Harris |
| 7,941,525 | B1 | 5/2011 | Yavilevich |
| 7,949,565 | B1 | 5/2011 | Eldering et al. |
| 7,949,639 | B2 | 5/2011 | Hunt et al. |
| 7,958,234 | B2 | 6/2011 | Thomas et al. |
| 7,962,603 | B1 | 6/2011 | Morimoto |
| 8,006,259 | B2 | 8/2011 | Drake et al. |
| 8,046,255 | B2 | 10/2011 | Bistriceanu et al. |
| 8,060,601 | B1 | 11/2011 | Brown et al. |
| 8,087,041 | B2 | 12/2011 | Fu et al. |
| 8,091,101 | B2* | 1/2012 | Smith ............. G06Q 30/02 725/13 |
| 8,131,763 | B2 | 3/2012 | Tuscano et al. |
| 8,131,861 | B2 | 3/2012 | Butler et al. |
| 8,151,194 | B1 | 4/2012 | Chan et al. |
| 8,180,112 | B2 | 5/2012 | Kurtz et al. |
| 8,229,780 | B2 | 7/2012 | Davidow et al. |
| 8,235,814 | B2 | 8/2012 | Willis et al. |
| 8,266,687 | B2 | 9/2012 | Baldry |
| 8,271,886 | B2 | 9/2012 | Lee et al. |
| 8,280,683 | B2 | 10/2012 | Finkler |
| 8,302,120 | B2 | 10/2012 | Ramaswamy |
| 8,307,006 | B2 | 11/2012 | Hannan et al. |
| 8,370,489 | B2 | 2/2013 | Mazumdar et al. |
| 8,412,648 | B2 | 4/2013 | Karypis et al. |
| 8,453,173 | B1 | 5/2013 | Anderson et al. |
| 8,484,511 | B2 | 7/2013 | Tidwell et al. |
| 8,495,198 | B2 | 7/2013 | Sim et al. |
| 8,504,411 | B1 | 8/2013 | Subasic et al. |
| 8,504,507 | B1 | 8/2013 | Srinivasaiah |
| 8,514,907 | B2 | 8/2013 | Wright et al. |
| 8,543,454 | B2 | 9/2013 | Fleischman et al. |
| 8,549,552 | B2 | 10/2013 | Ramaswamy et al. |
| 8,600,796 | B1 | 12/2013 | Sterne et al. |
| 8,631,122 | B2 | 1/2014 | Kadam et al. |
| 8,660,895 | B1* | 2/2014 | Saurabh ............. G06Q 30/0204 705/14.42 |
| 8,688,524 | B1 | 4/2014 | Ramalingam et al. |
| 8,699,855 | B2* | 4/2014 | Harper ............. H04N 5/765 386/239 |
| 8,700,457 | B2 | 4/2014 | Craft |
| 8,713,168 | B2 | 4/2014 | Heffernan et al. |
| 8,751,461 | B2 | 6/2014 | Abraham et al. |
| 8,775,332 | B1 | 7/2014 | Morris et al. |
| 8,831,362 | B1 | 9/2014 | Steffens |
| 8,843,626 | B2 | 9/2014 | Mazumdar et al. |
| 8,843,951 | B1* | 9/2014 | Sherrets ............. H04N 21/472 709/224 |
| 8,898,689 | B2 | 11/2014 | Georgakis |
| 8,909,771 | B2 | 12/2014 | Heath |
| 8,910,195 | B1 | 12/2014 | Barney et al. |
| 8,930,701 | B2 | 1/2015 | Burbank et al. |
| 8,954,536 | B2 | 2/2015 | Kalus et al. |
| 8,973,023 | B1 | 3/2015 | Rao et al. |
| 8,984,547 | B2 | 3/2015 | Lambert et al. |
| 9,055,122 | B2 | 6/2015 | Grecco et al. |
| 9,071,886 | B2 | 6/2015 | Shkedi |
| 9,084,013 | B1 | 7/2015 | Arini et al. |
| 9,117,217 | B2 | 8/2015 | Wilson et al. |
| 9,215,489 | B2* | 12/2015 | Williams ............. H04N 21/4126 |
| 9,215,502 | B1* | 12/2015 | Sherrets ............. H04N 21/472 |
| 9,313,294 | B2* | 4/2016 | Perez ............. H04L 67/306 |
| 2002/0099609 | A1 | 7/2002 | Nascenzi et al. |
| 2002/0129368 | A1* | 9/2002 | Schlack ............. G06Q 30/02 725/46 |
| 2003/0006911 | A1 | 1/2003 | Smith et al. |
| 2003/0037131 | A1 | 2/2003 | Verma |
| 2003/0046385 | A1 | 3/2003 | Vincent |
| 2003/0065770 | A1 | 4/2003 | Davis et al. |
| 2003/0105604 | A1 | 6/2003 | Ash et al. |
| 2003/0177488 | A1 | 9/2003 | Smith et al. |
| 2003/0220901 | A1 | 11/2003 | Carr et al. |

(56) References Cited

U.S. PATENT DOCUMENTS

| | | |
|---|---|---|
| 2003/0229900 A1* | 12/2003 | Reisman .......... G06F 17/30873 725/87 |
| 2004/0088212 A1 | 5/2004 | Hill |
| 2004/0107125 A1 | 6/2004 | Guheen et al. |
| 2004/0167928 A1 | 8/2004 | Anderson et al. |
| 2004/0186840 A1 | 9/2004 | Dettinger et al. |
| 2005/0144069 A1 | 6/2005 | Wiseman et al. |
| 2005/0166233 A1 | 7/2005 | Beyda et al. |
| 2005/0223093 A1 | 10/2005 | Hanson et al. |
| 2005/0267799 A1 | 12/2005 | Chan et al. |
| 2006/0074953 A1 | 4/2006 | Dettinger et al. |
| 2006/0089754 A1 | 4/2006 | Mortenson |
| 2006/0178996 A1 | 8/2006 | Matsushima et al. |
| 2006/0271641 A1 | 11/2006 | Stavrakos et al. |
| 2006/0294259 A1 | 12/2006 | Matefi et al. |
| 2007/0043769 A1 | 2/2007 | Kasahara et al. |
| 2007/0106787 A1 | 5/2007 | Blumenau |
| 2007/0106792 A1 | 5/2007 | Blumenau |
| 2007/0156532 A1 | 7/2007 | Nyhan et al. |
| 2007/0198327 A1 | 8/2007 | Yazdani et al. |
| 2007/0260603 A1 | 11/2007 | Tuscano et al. |
| 2007/0271518 A1 | 11/2007 | Tischer et al. |
| 2007/0271580 A1 | 11/2007 | Tischer et al. |
| 2008/0004958 A1 | 1/2008 | Ralph et al. |
| 2008/0086356 A1 | 4/2008 | Glassman et al. |
| 2008/0091639 A1 | 4/2008 | Davis et al. |
| 2008/0126420 A1 | 5/2008 | Wright et al. |
| 2008/0201427 A1 | 8/2008 | Chen |
| 2008/0201472 A1 | 8/2008 | Bistriceanu et al. |
| 2008/0222201 A1 | 9/2008 | Chen et al. |
| 2008/0235243 A1 | 9/2008 | Lee et al. |
| 2008/0248815 A1 | 10/2008 | Busch |
| 2008/0276179 A1 | 11/2008 | Borenstein et al. |
| 2008/0300965 A1 | 12/2008 | Doe |
| 2009/0030780 A1 | 1/2009 | York et al. |
| 2009/0055241 A1 | 2/2009 | Chen et al. |
| 2009/0070443 A1 | 3/2009 | Vanderhook et al. |
| 2009/0070797 A1 | 3/2009 | Ramaswamy et al. |
| 2009/0076899 A1 | 3/2009 | Gbodimowo |
| 2009/0171762 A1 | 7/2009 | Alkove et al. |
| 2009/0217315 A1 | 8/2009 | Malik et al. |
| 2009/0292587 A1 | 11/2009 | Fitzgerald |
| 2009/0300675 A1 | 12/2009 | Shkedi |
| 2009/0307084 A1 | 12/2009 | Monighetti et al. |
| 2009/0327026 A1 | 12/2009 | Bistriceanu et al. |
| 2010/0010866 A1 | 1/2010 | Bal et al. |
| 2010/0017049 A1 | 1/2010 | Swearingen et al. |
| 2010/0070621 A1 | 3/2010 | Urdan et al. |
| 2010/0088152 A1 | 4/2010 | Bennett |
| 2010/0088373 A1 | 4/2010 | Pinkham |
| 2010/0121676 A1 | 5/2010 | Jackson |
| 2010/0153175 A1 | 6/2010 | Pearson et al. |
| 2010/0153544 A1 | 6/2010 | Krassner et al. |
| 2010/0161385 A1 | 6/2010 | Karypis et al. |
| 2010/0191723 A1 | 7/2010 | Perez et al. |
| 2010/0205057 A1 | 8/2010 | Hook et al. |
| 2010/0241745 A1 | 9/2010 | Offen et al. |
| 2010/0262498 A1 | 10/2010 | Nolet et al. |
| 2010/0268540 A1 | 10/2010 | Arshi et al. |
| 2010/0268573 A1 | 10/2010 | Jain et al. |
| 2010/0281178 A1 | 11/2010 | Sullivan |
| 2010/0299604 A1 | 11/2010 | Blumenau |
| 2010/0312854 A1 | 12/2010 | Hyman |
| 2010/0313009 A1 | 12/2010 | Combet et al. |
| 2010/0325051 A1 | 12/2010 | Etchegoven |
| 2011/0016482 A1 | 1/2011 | Tidwell et al. |
| 2011/0041062 A1 | 2/2011 | Singer et al. |
| 2011/0087519 A1 | 4/2011 | Fordyce, III et al. |
| 2011/0093327 A1 | 4/2011 | Fordyce, III et al. |
| 2011/0106620 A1 | 5/2011 | Setiawan et al. |
| 2011/0131596 A1 | 6/2011 | Amsterdam et al. |
| 2011/0137733 A1 | 6/2011 | Baird et al. |
| 2011/0153391 A1 | 6/2011 | Tenbrock |
| 2011/0157475 A1 | 6/2011 | Wright et al. |
| 2011/0191184 A1 | 8/2011 | Blackhurst et al. |
| 2011/0191664 A1 | 8/2011 | Sheleheda et al. |
| 2011/0191831 A1 | 8/2011 | Chan et al. |
| 2011/0196735 A1 | 8/2011 | Von Sydow et al. |
| 2011/0202500 A1 | 8/2011 | Warn et al. |
| 2011/0208860 A1 | 8/2011 | Sim et al. |
| 2011/0231240 A1 | 9/2011 | Schoen et al. |
| 2011/0246297 A1 | 10/2011 | Buchalter et al. |
| 2011/0246306 A1 | 10/2011 | Blackhurst et al. |
| 2011/0246641 A1 | 10/2011 | Pugh et al. |
| 2011/0282730 A1 | 11/2011 | Tarmas |
| 2011/0288907 A1 | 11/2011 | Harvey et al. |
| 2012/0005213 A1 | 1/2012 | Hannan et al. |
| 2012/0030037 A1 | 2/2012 | Carriero |
| 2012/0042005 A1 | 2/2012 | Papakostas et al. |
| 2012/0072469 A1* | 3/2012 | Perez .............. G06Q 30/0204 707/810 |
| 2012/0109709 A1 | 5/2012 | Fordyce, III et al. |
| 2012/0109882 A1 | 5/2012 | Bouse et al. |
| 2012/0110027 A1 | 5/2012 | Falcon |
| 2012/0110071 A1 | 5/2012 | Zhou et al. |
| 2012/0143713 A1 | 6/2012 | Dittus et al. |
| 2012/0151079 A1 | 6/2012 | Besehanic et al. |
| 2012/0151322 A1 | 6/2012 | Lindsay et al. |
| 2012/0158490 A1 | 6/2012 | Neumeyer et al. |
| 2012/0173701 A1 | 7/2012 | Tenbrock |
| 2012/0185274 A1 | 7/2012 | Hu |
| 2012/0192214 A1 | 7/2012 | Hunn et al. |
| 2012/0206331 A1 | 8/2012 | Gandhi |
| 2012/0209920 A1 | 8/2012 | Neystadt et al. |
| 2012/0215621 A1 | 8/2012 | Heffernan et al. |
| 2012/0239407 A1 | 9/2012 | Lynch et al. |
| 2012/0239809 A1 | 9/2012 | Mazumdar et al. |
| 2012/0265606 A1 | 10/2012 | Patnode |
| 2012/0302222 A1 | 11/2012 | Williamson et al. |
| 2012/0310729 A1 | 12/2012 | Dalto et al. |
| 2012/0311017 A1 | 12/2012 | Sze et al. |
| 2013/0007794 A1 | 1/2013 | Besehanic et al. |
| 2013/0013308 A1 | 1/2013 | Cao et al. |
| 2013/0014144 A1 | 1/2013 | Bhatia et al. |
| 2013/0019262 A1 | 1/2013 | Bhatia et al. |
| 2013/0046615 A1 | 2/2013 | Liyange |
| 2013/0060629 A1 | 3/2013 | Rangsikitpho et al. |
| 2013/0066713 A1 | 3/2013 | Umeda |
| 2013/0080263 A1 | 3/2013 | Goldman et al. |
| 2013/0097311 A1 | 4/2013 | Mazumdar et al. |
| 2013/0097312 A1 | 4/2013 | Mazumdar et al. |
| 2013/0117103 A1 | 5/2013 | Shimizu et al. |
| 2013/0124628 A1 | 5/2013 | Weerasinghe |
| 2013/0138506 A1 | 5/2013 | Zhu et al. |
| 2013/0138743 A1 | 5/2013 | Amento et al. |
| 2013/0145022 A1 | 6/2013 | Srivastava et al. |
| 2013/0159499 A1 | 6/2013 | Besehanic |
| 2013/0198125 A1 | 8/2013 | Oliver et al. |
| 2013/0204694 A1 | 8/2013 | Banister et al. |
| 2013/0246389 A1 | 9/2013 | Osann, Jr. |
| 2013/0246609 A1 | 9/2013 | Topchy et al. |
| 2013/0254787 A1 | 9/2013 | Cox et al. |
| 2013/0282898 A1 | 10/2013 | Kalus et al. |
| 2013/0290070 A1 | 10/2013 | Abraham et al. |
| 2013/0297411 A1 | 11/2013 | Van Datta et al. |
| 2013/0325588 A1 | 12/2013 | Kalyanam et al. |
| 2013/0331971 A1 | 12/2013 | Bida et al. |
| 2013/0332604 A1 | 12/2013 | Seth et al. |
| 2013/0339991 A1 | 12/2013 | Ricci |
| 2014/0033317 A1 | 1/2014 | Barber |
| 2014/0067950 A1* | 3/2014 | Winograd ............ G06Q 50/01 709/204 |
| 2014/0075004 A1 | 3/2014 | Van Dusen et al. |
| 2014/0108130 A1 | 4/2014 | Vos et al. |
| 2014/0122703 A1 | 5/2014 | Pugh et al. |
| 2014/0156761 A1 | 6/2014 | Heffernan et al. |
| 2014/0173646 A1 | 6/2014 | Ramaswamy |
| 2014/0233430 A1 | 8/2014 | Russell |
| 2014/0279074 A1 | 9/2014 | Chen et al. |
| 2014/0282665 A1 | 9/2014 | Arini |
| 2014/0298025 A1 | 10/2014 | Burbank et al. |
| 2014/0324544 A1 | 10/2014 | Donato et al. |
| 2014/0324545 A1 | 10/2014 | Splaine et al. |
| 2014/0337104 A1 | 11/2014 | Splaine et al. |

(56) References Cited

U.S. PATENT DOCUMENTS

| | | |
|---|---|---|
| 2014/0347991 A1 | 11/2014 | Blicker |
| 2015/0006752 A1 | 1/2015 | O'Hare et al. |
| 2015/0019322 A1 | 1/2015 | Alla et al. |
| 2015/0019327 A1 | 1/2015 | Mazumdar et al. |
| 2015/0046579 A1 | 2/2015 | Perez et al. |
| 2015/0052245 A1 | 2/2015 | McMillan |
| 2015/0181267 A1 | 6/2015 | Morales et al. |
| 2015/0186403 A1 | 7/2015 | Srivastava et al. |
| 2015/0189500 A1 | 7/2015 | Bosworth et al. |
| 2015/0193816 A1 | 7/2015 | Toupet et al. |
| 2015/0262207 A1 | 9/2015 | Rao et al. |
| 2015/0341684 A1* | 11/2015 | Kitts .................. H04N 21/8456 725/14 |

FOREIGN PATENT DOCUMENTS

| | | |
|---|---|---|
| CN | 101077014 | 11/2007 |
| CN | 101222348 | 7/2008 |
| CN | 101505247 | 8/2009 |
| CN | 101536503 | 9/2009 |
| CN | 104520839 | 4/2015 |
| CN | 104541513 | 4/2015 |
| CN | 104584564 | 4/2015 |
| GB | 2176639 | 12/1986 |
| JP | 07262167 | 10/1995 |
| JP | 2001282982 | 10/2001 |
| JP | 2001357192 | 12/2001 |
| JP | 2002163562 | 6/2002 |
| JP | 2002373152 | 12/2002 |
| JP | 2004504674 | 2/2004 |
| JP | 2006127320 | 5/2006 |
| JP | 2006127321 | 5/2006 |
| JP | 2010039845 | 2/2010 |
| JP | 2010257448 | 11/2010 |
| KR | 20020037980 | 5/2002 |
| KR | 20090020558 | 2/2009 |
| KR | 20100094021 | 8/2010 |
| KR | 20110017895 | 2/2011 |
| KR | 20110023293 | 3/2011 |
| KR | 20120091411 | 8/2012 |
| KR | 20120123148 | 11/2012 |
| WO | 9617467 | 6/1996 |
| WO | 9628904 | 9/1996 |
| WO | 9641495 | 12/1996 |
| WO | 0041115 | 7/2000 |
| WO | 0152168 | 7/2001 |
| WO | 0207054 | 1/2002 |
| WO | 03027860 | 4/2003 |
| WO | 2005013072 | 2/2005 |
| WO | 2005024689 | 3/2005 |
| WO | 2008150575 | 12/2008 |
| WO | 2010088372 | 8/2010 |
| WO | 2010095867 | 8/2010 |
| WO | 2010104285 | 9/2010 |
| WO | 2011097624 | 8/2011 |
| WO | 2012019643 | 2/2012 |
| WO | 20120140371 | 3/2012 |
| WO | 2012087954 | 6/2012 |
| WO | 2012128895 | 9/2012 |
| WO | 2012170902 | 12/2012 |
| WO | 2012177866 | 12/2012 |
| WO | 2013122907 | 8/2013 |
| WO | 2013188429 | 12/2013 |
| WO | 2014059319 | 4/2014 |
| WO | 2014176343 | 10/2014 |
| WO | 2014179218 | 11/2014 |
| WO | 2014182764 | 11/2014 |
| WO | 2015005957 | 1/2015 |
| WO | 2015023589 | 2/2015 |
| WO | 2015102796 | 7/2015 |
| WO | 2015102803 | 7/2015 |

OTHER PUBLICATIONS

Braverman, "Are the Online Marketing Efforts of TV Shows and Programs Worthwhile?," Harris, A Nielsen Company, Mar. 30, 2011, 5 pages.

Peter J. Danaher, "A Canonical Expansion Model for Multivariate Media Exposure Distributions: A Generalization of the Duplication of Viewing Law," Journal of Marketing Research, Aug. 1991, 7 pages.

Enoch et al., "Cracking the Cross-Media Code," Journal od Advertising Research, Jun. 2010, 13 pages.

Headen et al., "The Duplication of Viewing Law and Television Media Schedule Evaluation," Journal of Marketing and Reasearch, vol. XVI, Aug. 1979, 333-40, 9 pages.

Huang et al., "Modeling the Audience's Banner ad Exposure for Internet Advertising Planning," Journal of Advertising, vol. 35, No. 2, Summer 2006, pp. 123-136, 15 pages.

The Nielsen Company, "How Teens Use Media," Jun. 2009, 17 pages.

Arbitron, "The Infinite Dial 2011: Navigating Digital Platforms," Edison Research, 2011, 83 pages.

Rust et al., "A Comparative Study of Television Duplication Models," Journal of Adverstising, vol. 10, No. 3, 1981, pp. 42-46, 6 pages.

Jim Edwards, "Apple Wants More Advertisers to Use Its iPhone Tracking System," Business Insider, Jun. 13, 2013, 2 pages.

Facebook, "Measuring Conversions on Facebook, Across Devices and in Mobile Apps," Aug. 2014, 3 pages.

Georg et al., "How Many Millenials Visit YouTube? Estimating Unobserved Events From Incomplete Panel Data Conditioned on Demographic Covariates," Google Inc., Apr. 27, 2015, 27 pages.

Georg et al., "How Many People Visit YouTube? Imputing Missing Events in Panels With Excess Zeros," Google Inc., 2015, 8 pages.

Adam, "Privacy Preserving Integration of Health Care Data," AMIA Annual Symposium Proceedings, 2007, 6 pages.

Emil Protalinski, "Facebook denies cookie tracking allegations," ZDNet, Sep. 25, 2011, 2 pages.

Emil Protalinski, "Facebook fixes cookie behavior after logging out," ZDNet, Sep. 27, 2011, 2 pages.

Emil Protalinski, "US congressman ask FTC to investigate Facebook cookies," ZDNet, Sep. 28, 2011, 2 pages.

Fliptop, "Fliptop Person API Documentation," https://developer.fliptop.com/documentation, May 7, 2013, 6 pages.

Fliptop, "Features," www.fliptop.com/features#social_matching, May 7, 2013, 3 pages.

Fliptop, "What is Fliptop?," May 7, 2013, www.fliptop.com/about_us1, page.

Webmaster World, "How to get the address of the current page (in browser) with Javascript," Sep. 28, 2005, 4 pages.

William Launder, "Media Journal: Nielsen to Test Online—TV Viewing Tool," Corporate Intelligence, Apr. 30, 2013, 2 pages.

Wikipedia, "Mental Poker," https://en.wikipedia.org/wiki/Mental_poker, page last modified on Jan. 12, 2010, 5 pages.

Nielsen, "Nielsen Unveils New Online Advertising Measurement," http://nielsen.com/us/en/insights/press-room/2010/nielsen_unveils_newonlineadvertisingmeasure . . . , 2010, The Nielsen Company, 3 pages.

Nik Cubrilovic, "Logging out of Facebook is not enough," New Web Order, Sep. 25, 2011, 3 pages.

Rapleaf, "Rapleaf | Fast. Simple. Secure.," copyright 2013, www.rapleaf.com/why-rapleaf/ , 3 pages.

Rapleaf, "Frequently Asked Questions," copyright 2013, www.rapleaf.com/about-us/faq/#where, 3 pages.

Rapleaf, "The Consumer Data Marketplace," copyright 2013, http://www.rapleaf.com/under-the-hood/, 2 pages.

Amol Sharma, "Nielsen Gets Digital to Track Online TV Viewers," The Wall Street Journal, WSJ.com, Apr. 30, 2013, 3 pages.

Steve Coffey, "Internet Audience Measurement: A Practitioner's View," Journal of Interactive Advertising, vol. 1 No. 2, Spring 2001, pp. 10-17, 8 pages.

Tanzina Vega, "Nielsen Introduces New Ad Measurement Product," Media Decoder, The New York Times, Sep. 27, 2010, 7 pages.

Suzanne Vranica, "Nielsen Testing a New Web-Ad Metric," The Wall Street Journal, Sep. 23, 2010, 2 pages.

(56) References Cited

OTHER PUBLICATIONS

Hothorn, "Unbiased Recursive Partitioning: A Conditional Inference Framework," Journal of Computational and Graphical Statistics,vol. 15, No. 3, pp. 651-674, copyright 2006 American Statistical Association, Institute of Mathematical Statistics, and Interface Foundation of North America, 21 pages.

Taboga, "Linear combinations of normal random variables", from "Lectures on probability and statistics," 2010, retrieved from <http://www.statlect.com/normal_distribution_linear_combinations.htm> (4 pages).

Read et al., "Classifier Chains for Multi-Label Classification," Machine Learning, Jun. 30, 2011 (16 pages).

United States Patent and Trademark, "Non-final Office Action," issued in connection with U.S. Appl. No. 14/967,355, dated Feb. 10, 2017, 23 pages.

United States Patent and Trademark Office, "Final Office Action," issued in connection with U.S. Appl. No. 14/967,355, dated Aug. 10, 2017, 28 pages.

\* cited by examiner

600 ⟶

| Data Element |
|---|
| HH ID |
| Device Count |
| Person count |
| Income (Optional) |
| Presence of Children (Optional) |
| DMA |

| Data Element |
|---|
| HH ID |
| Person_ID |
| Age |
| Gender |
| Race (Optional) |
| Hispanic Y/N (Optional) |

| Data Element |
|---|
| Device_ID |
| 7DAY_Content_Genre |
| 7DAY Daypart |
| 7DAY_Total_Minutes |

| Data Element | Description | Example |
|---|---|---|
| Device ID | Device ID associated to the APPLE TV | |
| Hashed USERID | USERID associated to the APPLE TV viewing | |
| HH_ID | Associated Household Number | |
| Location | Location within House in which AppleTV is located | Bedroom, Living Room |

| Data Element | Description | Example |
|---|---|---|
| Device ID | Corresponds to the physical device. | 01 |
| Apple_ID | Corresponds to the account holder. | ax185e |
| App/Site Name | Watch ABC | Watch ABC |
| App version | X.X. | X.X. |
| Video URL | Used for browser video measurement. Refers to the URL of the video played. Can be used for calibration later. | |
| Program Name | Scandal | Scandal |
| Channel Name | ABC, ABC Family | ABC, ABC Family |
| Episode Title | Scandal S1:E1 | Scandal S1:E1 |
| Content Id | Unique video identifier from the content provider | ABC_1234 |
| Custom Field 1 | Custom reporting segment | (Place holder) |
| Custom Field 2 | Custom reporting segment | Primetime |
| Asset Length | Length of an episode in seconds. | Ex. 1800 seconds (i.e. 30 minutes) |
| DMA | DMA (Designated Market Area) | 501 |
| Country code | ISO Country Code 2 - CHAR | US |
| Content Viewed Duration (in seconds) | Viewed content duration within a given collected segment | 300 |
| Ad Viewed Duration (in seconds) | Viewed duration for Ads within a given collected segment | |
| Event Collection Time | Time of event collection | |
| Num of Ads | Number of ads within the collected segment | |
| IP Address | Generally used to derive location details | |
| Genre | May be collected as part of the content reference | |

| Data Element | Description | Example |
|---|---|---|
| Data Date | Date when the content is collected/viewing associated to. | 5/21/2015 |
| Collection Date | Reporting Date based on the collection day definition. | g.g: 5/21/2015 for 6AM 5/21 to 6AM 5/22. |
| App/Site Name | Watch ABC | Watch ABC |
| Program Name | Scandal | Scandal |
| Channel Name /ID | ABC, ABC Family | ABC, ABC Family |
| Episode Title | Scandal S1:E1 | Scandal S1:E1 |
| Content Id | Unique video asset identifier from the content provider | ABC_1234 |
| Custom Field 1 | Custom reporting segment | Comedy |
| Custom Field 2 | Custom reporting segment | Primetime |
| Asset Length | Length of an episode in seconds. | Ex. 1800 seconds (i.e. 30 minutes) |
| DMA | DMA (Designated Market Area) | 501 |
| Country code | ISO Country Code 2 CHAR | US |
| Content Viewed Duration (in seconds) | Sum of Content Viewed Duration | |
| Ad Viewed Duration (in seconds) | Sum of Ad Viewed Duration (optional) | |
| Num of Ads | Number of ads within the collected segment (optional) | |

| Data Element | Description | Example |
|---|---|---|
| Data Date | Date when the content is collected/viewing associated to. | |
| App/Site Name | Watch ABC | Watch ABC |
| Program Name | Scandal | Scandal |
| Channel Name /ID | ABC, ABC Family | ABC, ABC Family |
| Episode Title | Scandal S1:E1 | Scandal S1:E1 |
| Content Id | Unique video identifier from the content provider | ABC_1234 |
| Custom Field 1 | Custom reporting segment | Comedy |
| Custom Field 2 | Custom reporting segment | Primetime |
| Asset Length | Length of an episode in seconds. | Ex. 1800 seconds (i.e. 30 minutes) |

| Data Element | Description | Example |
|---|---|---|
| Content_ID | Unique video content ID from the content | SB_1011 |
| Channel | Channel as per the collection | NICK |
| Brand | Market view hierarchy Brand | VIACOM |
| Sub-Brand | Market view hierarchy Sub_Brand | NICKELODEON |
| Program | Content hierarchy Program | SPONGE BOB |
| Episode | Content hierarchy Episode | S3_E10 |

FIG. 6H

| Aggregation ID | D | bc | bcs | bcsp | bcspe | bcs1 | bcs1 |
| --- | --- | --- | --- | --- | --- | --- | --- |
| Aggregation Name | Demo File | brand country | brand country subbrand | brand country subbrand Program | brand country subbrand Program Episode | brand country segment B | brand country segment C |
| Tuned Channel | x | ALL | ALL | ALL | ALL | ALL | ALL |
| Brand | ALL | x | x | x | x | x | x |
| Sub-Brand | ALL | ALL | x | x | x | ALL | ALL |
| Program | x | ALL | ALL | x | x | ALL | ALL |
| Episode | x | ALL | ALL | ALL | x | ALL | ALL |
| Content ID | x | ALL | ALL | ALL | ALL | ALL | ALL |
| Segment-B | x | ALL | ALL | ALL | ALL | x | ALL |
| Segment-C | x | ALL | ALL | ALL | ALL | ALL | x |
| Country | x | x | x | x | x | x | x |
| DMA | x | ALL | ALL | ALL | ALL | ALL | ALL |
| Age Bucket | x | x | x | x | x | x | x |
| Gender | x | x | x | x | x | x | x |
| Video Starts | x | x | x | x | x | x | x |
| Unique Audience | x | x | x | x | x | x | x |
| Duration | x | x | x | x | x | x | x |
| Ad Duration | x | x | x | x | x | x | x |
| Ad Count | x | x | x | x | x | x | x |

FIG. 6I

| ID | Period | Channel | Brand | Sub-Brand | Program | Episode | Content ID | Segment-B | Segment-C |
| --- | --- | --- | --- | --- | --- | --- | --- | --- | --- |
| bcspe | daily | CBS | ALL | ALL | Survivor | BBT S1 E1 | CBS_11111 | SITCOM | Season1 |
| bcspe | daily | CBS | ALL | ALL | Survivor | BBT S1 E2 | CBS_11111 | SITCOM | Season1 |
| bcspe | daily | CBS | ALL | ALL | Survivor | BBT S1 E1 | CBS_11111 | SITCOM | Season1 |

FIG. 6J

| Country | DMA | Age | Gender | Video Starts | UA | Duration | Ad Duration | Ad Count |
| --- | --- | --- | --- | --- | --- | --- | --- | --- |
| US | 501 | 18 | M | 8,000 | 7,650 | 7,200,000 | 1,080,000 | 54,000 |
| US | 501 | 19 | M | 6,000 | 5,200 | 5,400,000 | 810,000 | 40,500 |
| US | 501 | 20 | M | 9,200 | 8,000 | 8,280,000 | 1,242,000 | 62,100 |

ON-SITE MEASUREMENT OF OVER THE TOP MEDIA

FIELD OF THE DISCLOSURE

This disclosure related generally to monitoring media and, more particularly, to methods and apparatus for on-site measurement of over the top media.

BACKGROUND

Over-the-top devices receive and process streaming media transmitted from Internet sources to households via Internet protocol (IP) communications. The streaming media may include live programming, video on-demand, user-generated media, and/or other types of media. Over-the-top devices may be registered to users of the households. In recent years, over-the-top devices have become a primary source for media presentation in some user households.

BRIEF DESCRIPTION OF THE DRAWINGS

FIGS. 6A-6K illustrate example data that may be communicated between the example OTT service provider, the example AME on-site meter, and the example AME server of FIG. 1.

The figures are not to scale. Wherever possible, the same reference numbers will be used throughout the drawing(s) and accompanying written description to refer to the same or like parts.

DETAILED DESCRIPTION

Figure 1:
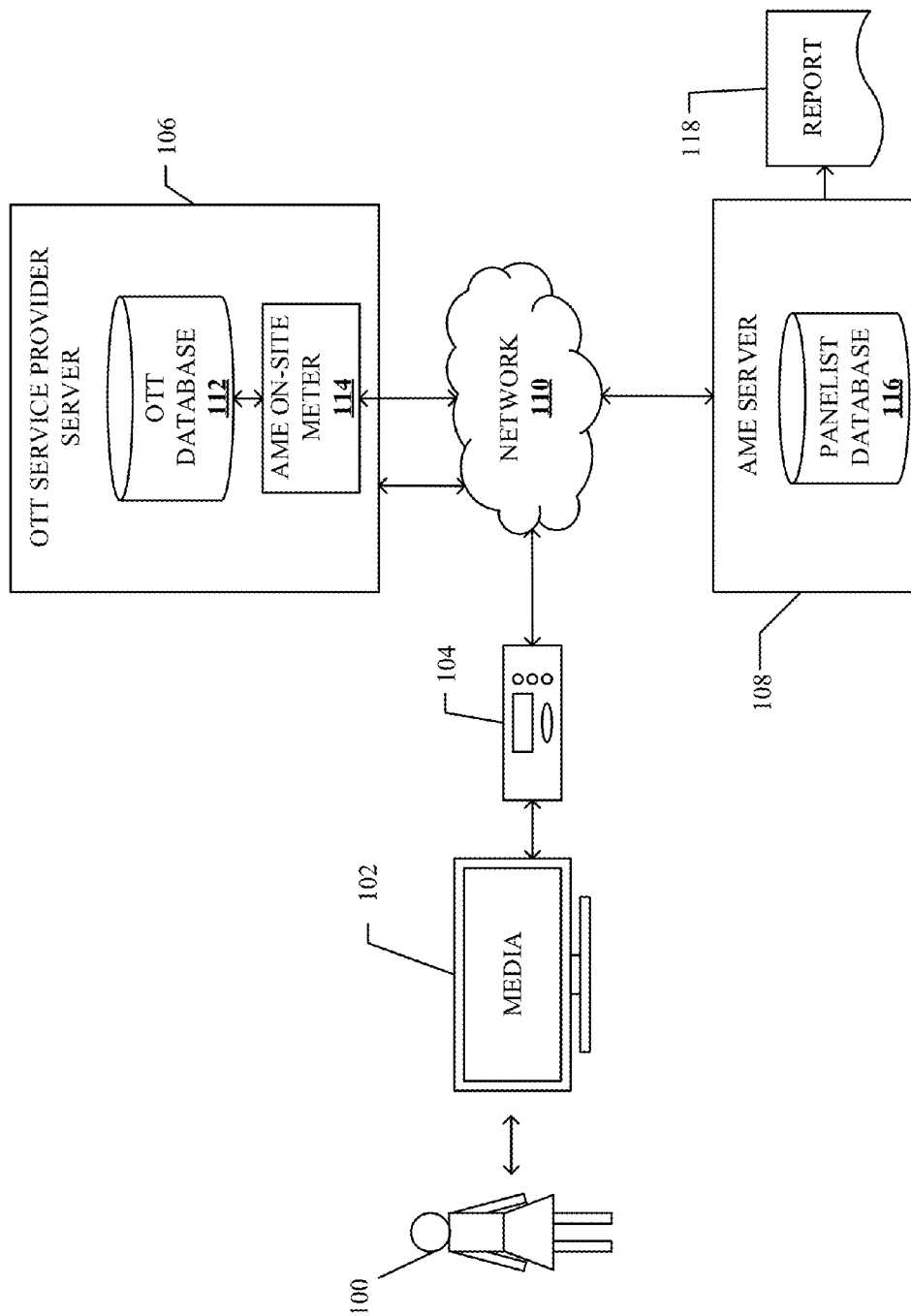
FIG. 1 illustrates an example environment in which an audience measurement entity (AME) determines audience measurement data based on a received event from an example over the top (OTT) device.

Examples disclosed herein may be used to correct demographic impression information for any type of media (e.g., content and/or advertisements) processed (e.g., presented) through use of over the top (OTT) devices. As used herein, OTT refers to the delivery of audio, video, and/or other media over the Internet without a multiple-system operator being involved in the control and/or distribution of the media. For example, OTT media is distributed from one or more third parties to an end user through an Internet-enabled device. While examples disclosed herein generally refer to OTT media processed by OTT devices, such examples may apply to any media delivered via satellite, cable television, radio frequency (RF) terrestrial broadcast, the Internet (e.g., internet protocol television (IPTV)), television broadcasts, radio broadcasts and/or any other type(s) of transmission for delivering media where little, none, or incorrect demographic impression information exists.

As used herein, an impression is defined to be an event in which a home or individual is exposed to corresponding media. Thus, an impression represents a home or an individual having been exposed to media (e.g., an advertisement, content, a group of advertisements, a collection of content, etc.). In Internet media access, a quantity of impressions or impression count is the total number of times media (e.g., content, an advertisement, an advertisement campaign, etc.) has been accessed by an Internet audience.

Media may include advertising and/or content. Example types of media include web pages, text, images, streaming video, streaming audio, movies, and/or any other type of content and/or advertisements. In some examples, media includes user-generated media that is, for example, uploaded to media upload sites such as YouTube and subsequently downloaded and/or streamed by one or more client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

In examples disclosed herein, an impression may be associated with the demographics of a person corresponding to the impression in order to track the person's exposure to media. As used herein, a demographic impression is defined to be an impression that is associated with one or more demographic characteristic(s) (e.g., age, gender, geographic location, race/ethnicity, income level, education level, religion, etc.) of the person exposed to the media. Mapping demographics to impressions enables, in some examples, measurements of media exposure and/or audience behavior across numerous demographic groups (e.g., different ages, different genders, etc.). These numerous demographic groups (e.g., different ages) are sometimes referred to as "demographic buckets." For example, demographic buckets may be defined for ages 7 and under, 8-12, 13-19, 20-25, 26-31, 32-43, 44-55, 56-64, and 65 and over.

Often OTT devices (e.g., Roku™ devices, Apple TV™ devices, Samsung™ TV devices, Chromecast™ devices, Amazon Fire TV™ devices, etc.) provide media (e.g., content and/or advertising) without tracking exposures (e.g., collection impressions) to the media. As a result, demographics are unknown for audiences exposed to the media. Prior techniques that collect impressions for online media accesses identify associated demographic information by using locally-installed panelist meter software executed on a personal computer and/or cookies to associate demographic data to collected impressions.

Typically, OTT devices do not operate with cookies, and they are not easily configurable to install and run panelist meter software. In some examples, OTT devices have corresponding device identifiers (IDs) that can be used to collect demographic impressions by associating impressions with demographics known to correspond to the OTT device IDs (e.g., based on OTT service user account information). However, if such device IDs are blocked, changed, or otherwise obscured (e.g., by users of the OTT devices), impressions collected using such device IDs may be unable to be associated with demographics because the obscured device IDs are unable to be used to identify demographics. As such, in prior techniques, the collected impressions corresponding to the obscured OTT device IDs may be arbitrarily spread across various demographic buckets in an attempt to associate demographics with such impressions. Examples disclosed herein can be used to increase the demographic accuracy of demographic impressions corresponding to OTT devices.

To associate demographics to an impression, the demographics of the person corresponding to the impression (or someone with similar demographics) are obtained as disclosed herein. Some OTT devices employ a user-registration model that may be used to obtain user demographics. As used herein, a user-registration model is a model in which users subscribe to media-delivery services by creating an account and providing demographic-related information about themselves. For example, such accounts may be created with manufacturers of the OTT devices and/or media service providers that enable media delivery to the OTT devices. In some instances, OTT device user-registration models provide only partial demographic data (e.g., age and/or email address) for a person or for a household (e.g., one person registers the OTT device and multiple people use the device). As such, user-registration models for OTT devices may not produce highly accurate demographic information about audience member that access media via the OTT devices.

Some examples disclosed herein may be used to leverage demographic information collected by an audience measurement entity (also referred to herein as "AME" and/or "ratings entities") to increase the completeness and/or demographic accuracy of demographic impressions associated with OTT devices. Traditionally, AMEs determine demographic reach, exposure, and other data for advertising and media programming based on registered panel members. That is, an AME enrolls people, who consent to being monitored, into a panel. During enrollment, the AME receives demographic information from the enrolling people so that subsequent correlations may be made between advertisement/media exposures to those panelists and different demographic markets. In some examples, the audience panel is implemented using Nielsen's National People Meter (NPM)™ panel. Often, the panelist data includes data that is more accurate than the OTT demographic data, but is smaller in sample size. Unlike traditional techniques in which audience measurement entities rely solely on their own panel member data to collect demographics-based audience measurements, example methods, apparatus, and/or articles of manufacture disclosed herein combine demographic information stored by an AME with demographic information from other entities (e.g., OTT service providers) that operate based on user-registration models.

In some examples of AME panel data, panelist demographics are plentiful because panelists create detailed profiles to represent themselves and their households. In some instances, people registered with an AME are also registered with one or more OTT service providers. In some examples, the AME and an OTT service provider have the same or substantially similar demographic data for the same person and/or household registered with both services. In other examples, AMEs and OTT service providers have different demographic data for the same person.

In examples disclosed herein, an AME gathers raw data from the OTT service provider to determine media impressions and demographics corresponding to registered users of an OTT device (or other similar device). The demographics of the users of the OTT device are then compared to demographics corresponding to registered panelists of AMEs to identify matches. In some examples disclosed herein, no matches occur between OTT devices (or other similar devices) and AMEs. This may occur because there is little to no demographic data (e.g., age, gender, etc.) available for a registrant through an OTT device. For example, the OTT device registration process may not require the demographic inputs for age or gender to register for media delivery services. Additionally or alternatively, there may be little to no demographic data (e.g., age, gender, etc.) available for the registrant through an OTT service provider. In some examples, an OTT device registrant is not associated with any AME panelist. In some examples, demographic data that exists for the registrant through an OTT device contradicts demographic data available through an AME. Such circumstances can lead to impressions with unknown demographics when an AME processes impressions from OTT devices to associate them with demographics from the AME. For example, impressions collected based on media accessed through OTT devices may be associated with no one in particular or may be labeled as "unknown" because they do not match any user registered with an AME. Empty demographics or non-attributions of demographics to impressions lead to gaps in overall audience metrics, which decreases the accuracy of audience measurements.

In other examples disclosed herein, there are matches between demographics corresponding to the OTT device registrants and demographics corresponding to AME panelists. For example, a match occurs when a user has the same or substantially similar basic demographic information (e.g., age, gender, location, etc.) registered with an OTT service provider and an AME. In other examples, more detailed demographics (e.g., personal income, viewing habits, etc.) are compared across user registrations to confirm a match indicative of a same person registered with, for example, the OTT service provider and the AME. In some examples, when the OTT user is not registered at the AME, the demographics of the user are predicted based on matching demographics of a panelist similar to a user. By matching demographics from an OTT device with demographics from an AME, examples disclosed herein may be used to combine, correct, and/or adjust demographics from OTT service providers and/or an AME to generate more accurate and/or more detailed demographics and demographic impressions.

These and other example methods, apparatus, systems, and articles of manufacture (e.g., physical storage media) to perform on-site measurement of OTT media are disclosed in further detail below.

In some instances, while a first user having first demographic characteristics in a household may register an OTT device and may have associated demographic data within a OTT service provider, another user (e.g., a second user, third user, a fourth user, etc.) with different demographic characteristics in the same household may use the same OTT device as the first user. In some examples, the OTT device has device identification (ID) and user profiles. However, impressions are often linked to the device ID and not the user profiles, because the user profiles do not require separate registration (and therefore, demographic data entry). For example, in households with multiple people, more than one person may share the OTT device (and thus, its device ID) to access media without providing an indication of which member of the household is using the device (e.g., an 8-year old male child may be using an OTT device having an OTT device ID registered to his 35-year old mother). In such an example, the impression data generated while the 8-year old male child was using the OTT device could be misattributed to the 35-year old mother. As such, impressions can be misattributed to the wrong household member. Such misattributions reduce the accuracy of audience measurement.

To improve accuracies of demographic impressions and audience measurement in general, examples disclosed herein may be used to create content hierarchy, to correct misattribution errors in demographic impressions, to predict the demographics of missing members of the household, to assign members of a household to particular impressions, and/or to determine a unique audience for various demographics.

Examples disclosed herein allow an AME to gather detailed media impression data by gathering data related to media exposure at the OTT service provider. In some examples, the AME can determine detailed impression data including data related to the media (e.g., application used, program name, channel name, episode title, genre, etc.) as well as data relating to the media exposure (e.g., device id, OTT id, such as an apple id, number of ads viewed, total duration viewed, video start time, etc.). In this manner, metering software (e.g., cookies, software development kits (SDKs), and/or other metering software) does not need to be installed on an OTT device in order to monitor media for the OTT devices. Additionally, gathering media exposure data directly from the OTT service provider allows the AME to build a content hierarchy to resolve anomalies, and provide logical nesting points used to aggregate and report data related to the impression.

Examples disclosed herein allow an AME to apply its panelist data to demographics information from external sources (e.g., database proprietors, OTT devices, etc.) to extend or supplement the coverage, accuracy, and/or completeness of the demographics information included in the OTT measurement data. Such access also enables the AME to acquire monitoring data (e.g., demographic impressions) of people (e.g., OTT device users) who would not otherwise have joined an audience measurement panel.

To increase the likelihood that measured viewership is accurately attributed to the correct demographics, examples disclosed herein use demographic information located in the AME's records in combination with demographic information located at a database of the OTT service provider. In this manner, examples disclosed herein may be used to supplement demographic information maintained by a ratings entity (e.g., an AME such as The Nielsen Company of Schaumburg, Ill., United States of America) that collects media exposure measurements and/or demographics with demographic information from the OTT service provider. Additionally, examples disclosed herein may be used to supplement and/or correct demographic information maintained by the OTT service provider with demographic information from the ratings entity and to determine a unique audience for various demographics.

The use of demographic information from disparate data sources (e.g., high-quality demographic information from the panels of an audience measurement company and/or registered user data of OTT service providers) results in improved reporting effectiveness of metrics for both online and offline advertising campaigns and/or media (e.g., downloaded and/or streamed video and/or audio media). Examples disclosed herein use data from OTT device providers and AMEs to create content hierarchy, to correct misattribution errors in demographic impressions, to predict the demographics of missing members of the household, to assign members of a household to particular impressions, and to determine a unique audience for various demographics.

More specifically, examples disclosed herein identify AME panelists that are also OTT device registrants, and analyze their demographic information as submitted to the AME panel database relative to their demographic information submitted to the OTT service provider. In this manner, examples disclosed herein compare AME panelist demographics to OTT service provider demographics of AME panelists that are a subset of OTT service provider registrations to build a model that, when applied to the entirety of the OTT service provider's demographic information, corrects deficiencies in the OTT service provider's demographics, assigns viewership to particular demographic impressions, predicts demographics missing or unknown in the OTT service provider's demographics, and determines unique audiences for various demographics.

Turning to the figures, FIG. 1 illustrates an example environment in which an AME determines audience measurement data based on a received events from an OTT device. FIG. 1 includes an example user 100, an example media presentation device 102, an example OTT device 104, an example OTT service provider server 106, an example AME server 108, an example network 110, an example OTT database 112, an example AME on-site meter 114, an example panelist database 116, and an example report 118.

In the illustrated example of FIG. 1, media may be requested by an example user 100 (e.g., an OTT device subscriber) through a media presentation device 102 (e.g., a television). The user 100 may be a head of household who, when signing up with an OTT service provider for OTT device service, enters various demographic information. The demographic information may be used to create a household profile that is stored in the example OTT database 112. The household profile may not have accurate household data, since the household data is conventionally based on the head of the household. For example, the household data may not account for other users such as children who do not typically register an OTT device.

In the illustrated example of FIG. 1, the example media presentation device 102 is connected to an example OTT device 104. The example OTT device 104 decodes received media and outputs the decoded media to the media presentation device 102 for presentation. In the illustrated example, the OTT device 104 may be any IP-based media delivery device capable of receiving, decoding, and presenting video, audio, and/or images. Example OTT devices include a Roku™ media device, an Apple TV™ media device, a Samsung™ TV media device, Google TV™ media device, a gaming console (e.g., a Microsoft Xbox™ gaming console, a Sony PlayStation™ gaming console, etc.), a smart DVD player, an audio-streaming device, etc. The example media presentation device 102 may be a television, a monitor, an audio receiver, an audio amplifier, etc. In some examples, the OTT device 104 is integrated in the media presentation device 102. The example OTT device 104 may include user registration information pertaining to an OTT device ID, a name, an address, an age, a gender, any combination thereof, or any other identifying information. In some examples, the OTT device 104 employs media streaming applications (e.g., apps) and/or a web browser to access media, some of which include instructions that cause the OTT device 104 to report media monitoring information to the example OTT service provider server 106.

In the illustrated example of FIG. 1, the example OTT service provider server 106 includes an example OTT database 112 and an example AME on-site meter 114. The example OTT service provider server 106 collects household data (e.g., user profile(s)) from the OTT device 104 via the example network 110 and stores the household data into the example OTT database 112. In some example, the household data includes the user registration data and impressions corresponding to media accessed via the OTT device 104. Additionally, the OTT service provider server 106 may update household data based on other non-OTT device profiles (e.g., profiles from music streaming services, tablet devices, mobile phones, MP3 players, etc., associated with the OTT service provider) from the same household stored in the OTT database 112. In an example impression collection phase, the OTT service provider server 106 collects events (e.g. media impressions) corresponding to media accessed via the OTT device 104. Events may include data describing what media was viewed, when it was viewed, where it was viewed, how much was viewed, etc. In some examples, however, the events include which household viewed the event, but may not include which person viewed the event within the household. Examples disclosed herein may be used to determine audience measurement data based on collected impression information for any type of media including content and/or advertisements. Media may include advertising and/or content such as web pages, streaming video, streaming audio, movies, and/or any other type of content and/or advertisements delivered via satellite, broadcast, cable television, radio frequency (RF) terrestrial broadcast, Internet (e.g., internet protocol television (IPTV)), television broadcasts, radio broadcasts and/or any other vehicle for delivering media. In some examples, media includes user-generated media that is, for example, uploaded to media upload sites such as YouTube™ and subsequently downloaded and/or streamed by one or more client devices for playback. Media may also include advertisements. Advertisements are typically distributed with content (e.g., programming). Traditionally, content is provided at little or no cost to the audience because it is subsidized by advertisers that pay to have their advertisements distributed with the content. As used herein, "media" refers collectively and/or individually to content and/or advertisement(s) of any type(s).

The example AME on-site meter 114 is a meter provided by an AME (e.g., the AME associated with the AME server 108) that is run at the OTT service provider server 106. By combining household data from the example OTT database 122 with panelist data from the example panelist database 116 in the AME server 108, the AME on-site meter 114 corrects demographics, assigns viewership, and determines audience measurement data based on a plurality of OTT devices, as further described herein.

Figure 5:
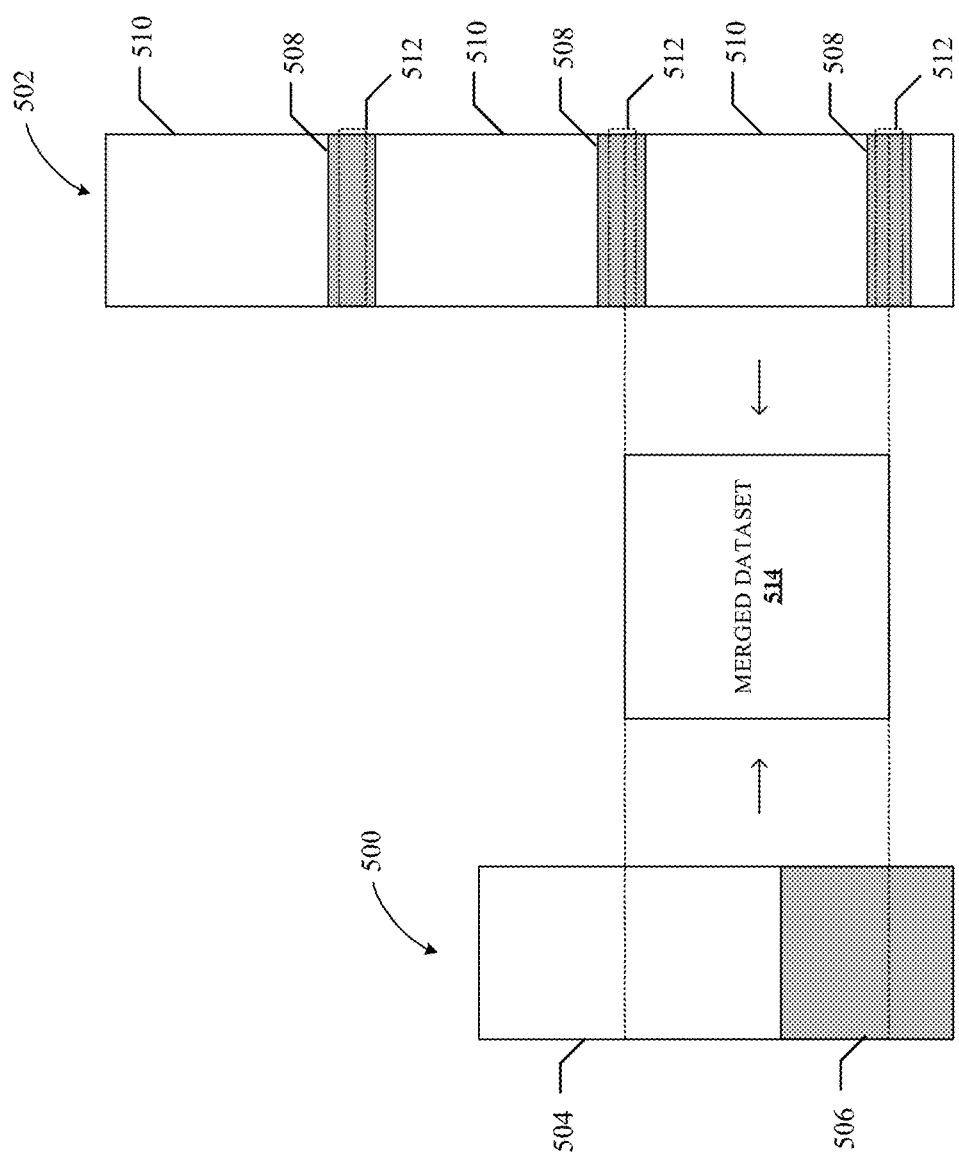
FIG. 5 illustrates an example panel matching process.

In the illustrated example of FIG. 1, the example AME server 108 sends panelist data (e.g., National People Meter (NPM)™ data) to the AME on-site meter 114 to merge household data with panelist data, as further described in FIG. 5. In some examples, the AME server 108 collects reference data (e.g., data related to received events) collected by the AME on-site meter 114 to create a content hierarchy used to determine a unique audience for media. Additionally, the example AME server 108 may generate reports based on the audience measurement data including missing users from household data, unique audiences, viewership assignments, media impression data, and/or any other data related to a media impression.

The illustrated example of FIG. 1 has two phases: the panel matching phase and the event collection phase. These two phases may be performed sequentially or in parallel. The panel matching phase includes the example AME on-site meter 114 collecting household data from the OTT database 112 and panelist data from the panelist database 116. In this phase, the AME on-site meter 114 may correct and/or update demographic attributes associated with one or more (or all) persons in a household where the OTT device 104 is available. For example, if the household belongs to a panelist of the AME, the AME on-site meter 114 may determine, based on AME panelist data, that a particular household contains users and/or demographic data missing from OTT household data associated with the household. In some examples, where the household does not correspond to a panelist, the AME on-site meter 114 may also predict missing users and/or demographic data based on matching demographics and/or viewing characteristics of a registered user 100 and a panelist from the panelist database 116.

The event collection phase includes collecting event data from the OTT device 104 stored in the OTT database 112. For example, when the OTT device 104 accesses media, an application and/or web browser of the OTT device 104 executes instructions to send event data associated with access and/or presentation of the media to the OTT service provider server 106 via the example network 110. The event data of the illustrated example may include a household ID, a time stamp, and/or data relating to the event. The example time stamp includes the date and time the media was presented. In some examples, the time stamp 305 includes the duration the media was presented. In some examples, the time stamp includes a start time and a stop time. The collected event is used to determine audience measurement data, which may be reported in the example report 118.

Figure 2:
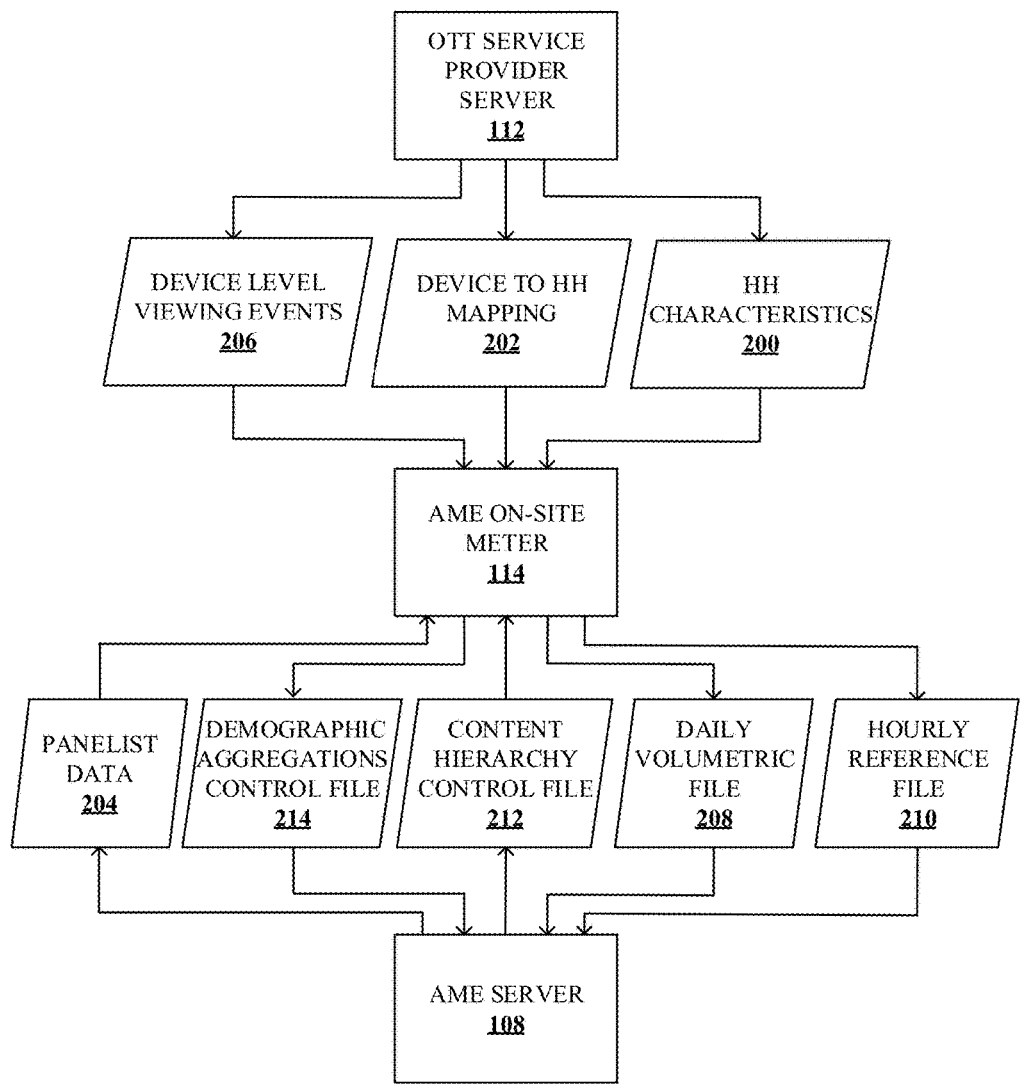
FIG. 2 illustrates an example of data communicated between an example OTT service provider, an example AME on-site meter, and an example AME server of FIG. 1.

FIG. 2 illustrates an example of data communicated between the example OTT database 112, the AME on-site meter 114, and the AME server 108. In the illustrated example, the communicated data includes example household characteristics 200, example device-to-household mappings 202, example panelist data 204, example device level viewing events 206, example daily volumetric files 208, example hourly reference files 210, example content hierarchy control files 212, and example demographic aggregations control file 214.

In the illustrated example of FIG. 2, the OTT database 112 transmits household characteristics 200 to the AME on-site meter 114. The household characteristics 200 are reported characteristics for each household where an OTT device is present. In some examples, the household characteristics 200 are based on information received during registration of the OTT device 104. In some examples, the household characteristics 200 are based on information received during registration of other non-OTT devices from the household (e.g., from the same service provider). The household characteristics 200 may include user demographics, user records, household records, and/or device behavior records. The household characteristics 200 may further include a household ID, a user ID, age, gender, race, a device count, a user count, a household income, presence of children, designated market area, viewed media genre records, viewed media time of day records, total viewed media minutes, etc. Data from the household characteristics 200 are used, in part, to develop demographic and view assignment models.

In the illustrated example of FIG. 2, the OTT database 112 transmits a device-to-household mapping 202 to the AME on-site meter 114. The device-to-household mapping 202 may map events to various devices of a household. The device-to-household mapping 202 may be pre-mapped to an anonymized event or independently provided to the AME on-site meter 114 for later aggregation services. In some examples, the device-to-household mapping 202 includes a device ID, a hashed user ID, a household ID, and/or a device location within the household. In some examples, the device-to-household mapping 202 may be used to more accurately develop a viewer assignment model. For example, a household may have one device dedicated to children within the household.

In the illustrated example of FIG. 2, the AME server 108 transmits panelist data 204 to the AME on-site meter 114. The panelist data 204 includes demographic data from panelists in a panel (e.g., a NPM panel) whose media exposure is monitored by an AME. The panelist data 204 may include data related to panelists whose households include an OTT device from an OTT service provider associated with the OTT service provider server 106. In this example, the panelist data 204 may be merged with the household characteristics 200 to supplement missing demographic data from the household data stored in the OTT database 112.

In the illustrated example of FIG. 2, the example OTT database 112 transmits example device level viewing events 206 to the AME on-site meter 114. The device level viewing events 206 include media exposure events from the OTT device 104 that are anonymized (e.g., by removing and/or encrypting personal identification information (PII) and/or other sensitive data) by the OTT database 112. For example, the device level viewing events 206 may include a device identifier (ID), a user ID, an application name, a site name, an application version, a Uniform Resource Identifier (e.g. URI), a program name, a channel name, an episode title, a content ID, a media length, a designated market area, a country code, a content viewed duration, an advertisement (ad) viewed duration, an event collection time, a number of ads, an IP address, a genre, and/or any other data related to the media impression. The device level viewing events 206 may be used to develop content hierarchy, correct demographics from a household, and/or assign viewership for a media event. Since the device level viewing events are obtained by the AME on-site meter 114 from the data available at the OTT database 112, there is no need for software (e.g., a software development kit (SDK)) to run on an OTT device (e.g., the OTT device 104) to gather media impressions, which eliminates the need and expense of additional resources.

In the illustrated example of FIG. 2, the AME on-site meter 114 transmits an example daily volumetric file 208 to the AME server 108. The daily volumetric file 208 is a summary of the events collected by the OTT database 112 for one day (e.g., 6 AM to 6 AM). The daily volumetric file 208 builds volumetric aggregations in the AME server 108. Additionally, the example daily volumetric file 208 may be used to authenticate a source or validate data. The daily volumetric file 208 may include a data date (e.g., date when the event data was created), a collection date, an application name, a website name, a program name, a channel ID, an episode title, an asset length (e.g., length of the event), a designated market area, a country code, a content viewed duration, an ad viewed duration, and a total number of viewed ads. Although the daily volumetric file 208 has been described as a file including data from one day, data collect over any amount of time may be used to create the volumetric file.

In the illustrated example of FIG. 2, the AME on-site meter 114 transmits an example hourly reference file 210 to the AME server 108. In the illustrated example, the hourly reference file 210 is a subset of the data from the daily volumetric file 208 (e.g., channel, program, episode, etc.), which is transmitted to the AME server 108 every hour. The hourly reference file 210 may include a data date, an application name, a website name, a program name, a channel ID, an episode title, a content ID, and/or an asset length. The example AME server 108 parses the hourly reference file 210 to look for any new content, change hierarchy, and/or changed attributes. In some examples, the AME may apply rules for episode and program normalization. Although the hourly reference file 210 has been described to be transmitted every hour, the reference file 210 may be created and transmitted at any appropriate interval of time.

In the illustrated example of FIG. 2, the AME server 108 transmits a content hierarchy control file 212 to the AME on-site meter 114. The content hierarchy control file 212 links collected device level viewing events 206 back to a media hierarchy of the AME. Additionally, the content hierarchy control file 212 may facilitate crediting between content and channel (e.g., for content that occurs in multiple channels and/or applications). In some examples, different content hierarchy control files 212 are aligned with different aggregation frequencies, so that there will be one file for daily aggregation, one for weekly aggregation, one for monthly aggregation, one for quarterly aggregation, etc. The AME on-site meter 114 creates the content hierarchy control file 212 based on user and/or administrator settings to create unique audience calculations for different levels in the hierarchy. For example, a user may want to aggregate audience measurement data to determine a unique audience having a particular demographic make-up (e.g., set of demographic characteristics) and watching events (e.g., the device level viewing events 206) associated with (e.g. owned by) a particular brand. The hierarchy control file 212 informs the AME on-site meter 114 of the specific way to aggregate the audience measurement data. Additionally, the AME on-site meter 114 may correct the hierarchy for unification within a brand (e.g., owner of the media) or sub-brand. For example, the AME server 108 may determine that the AME on-site meter 114 credited an incorrect brand or sub-brand for an event and may use the hierarchy control file 212 to correct and/or inform the AME on-site meter 114 of the error.

In the illustrated example of FIG. 2, the AME on-site meter 114 transmits audience measurement data including demographic aggregations control file 214 to the AME server 108. The demographic aggregations control file 214 includes data relating to a unique audience for various demographics selected from a demographic aggregation file, as further described in FIGS. 6I-K. In some examples, the demographic aggregations control file 214 includes a total number of video starts, a unique audience, a total viewed media duration, a total viewed ad duration, and/or a total ad count for a particular group of demographics. Additionally, the demographic aggregations control file 214 may include a tuned channel, a brand, a sub-brand, a program, an episode, a content ID, country, and/or a designated market area. For example, the demographic aggregations control file 214 may determine a unique audience for 18 year old males in Illinois that viewed a particular media event. The demographic aggregations control file 214 may be used by the AME server 108 to generate a report.

Figure 3:
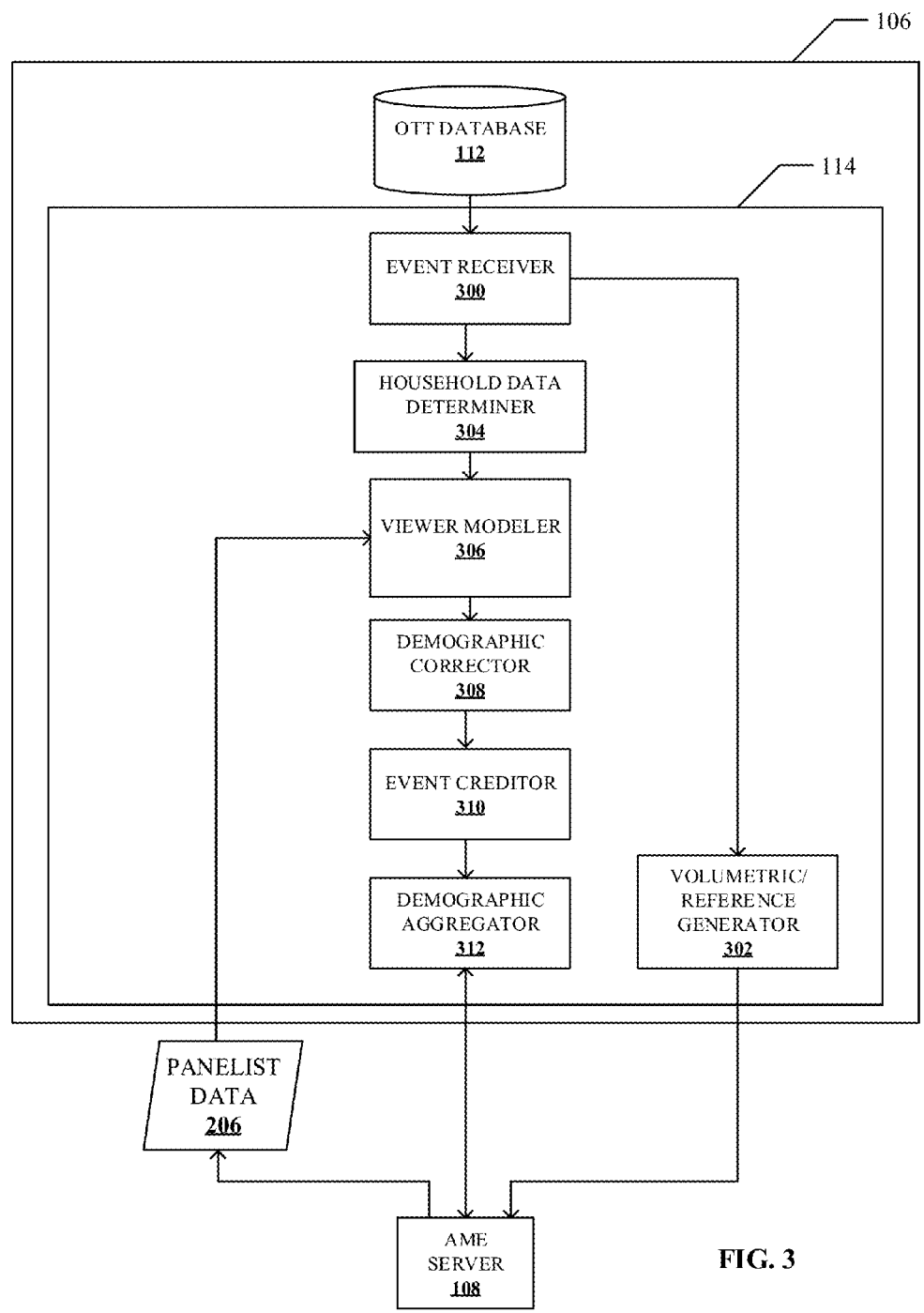
FIG. 3 illustrates an example block diagram of the AME on-site meter of FIG. 1.

FIG. 3 illustrates an example block diagram of the AME on-site meter 114 located within the OTT service provider server 106 of FIG. 1. The example block diagram includes the example AME server 108, the example OTT database 112 the example AME on-site meter 114, and the example panelist data 204 of FIG. 2. The example AME on-site meter 114 includes an example event receiver 300, an example volumetric/reference generator 302, an example household data determiner 304, an example data modeler 306, an example demographic corrector 308, an example event creditor 310, and an example demographic aggregator 312.

In the illustrated example of FIG. 3, the event receiver 300 receives OTT data from the OTT database 112 and collected from OTT devices associated with the OTT service provider server 106. The raw OTT data includes the device level viewing events 206, the device-to-household mapping 202, and the household characteristics 200. The example event receiver 300 sends the received data to the example volumetric/reference generator 302 and the example household data determiner 304. The volumetric/reference generator 302 generates the example daily volumetric file 208 and the example hourly reference files 210 based on the received raw OTT data. The volumetric/reference generator 302 transmits the daily volumetric file 208 and the hourly reference file 210 to the AME server 108 based on present elapses of time. For example, the volumetric/reference generator 302 may continue collecting media events until 24 hours have elapsed before transmitting the daily volumetric file 208 to the AME server 108. Additionally, the volumetric/reference generator 302 may continue collecting media events until 1 hour has elapsed before transmitting the hourly reference file 210 to the AME server 108.

In the illustration of FIG. 3, the household data determiner 304 determines household data for a household associated with a received event. The household data may include demographics of the user(s) registered to the OTT, a number of users in the household, demographics of the users of the household, OTT device IDs, user IDs, household IDs, etc. In some examples, the household data determiner 304 may identify missing demographics. For example, a registered user may have expired data or may not have provided one or more demographics to the OTT service provider associated with the OTT device. In this example, the household data determiner 304 can identify which demographics are missing or may be inaccurate. Additionally, the household data determiner 304 might determine inaccurate demographic data based on the media event received for the OTT device and the demographics stored for users of the OTT device. For example, if a household with an OTT device who is registered to a 25 year old male accesses media typically associated with a baby and/or toddler, the household data determiner 304 may determine that the household data should be updated to include a child.

In the illustrated example of FIG. 3, the example viewer modeler 306 receives the household data from the household data determiner 304 and the panelist data 204 from the AME server 108. The viewer modeler 306 merges the household data and the panelist data 204 to create a demographic model and a viewer assignment model. In some examples, the viewer modeler 306 generates a demographic model by associating a particular panelist from the AME server 108 to a particular household from the OTT database 112 based on a match of at least one demographic and/or viewing characteristic. In some examples, the viewer modeler 306 determines that a panelist has similar viewing characteristics with a household and the viewer modeler 306 may generate a demographic model based on an association between the panelist and the household. In this manner, the viewer modeler 306 may determine and/or predict missing demographics from the household data based on the matched panelist data. In some examples, the viewer modeler 306 may correct outdated and/or incorrect household data based on the matching panelist data.

To create a viewer assignment model, the viewer modeler 306 determines viewing characteristics from the panelist data. For example, the viewer modeler 306 may determine that cartoons involving princesses (e.g., a particular genre) are associated with females ages 3-8. In this manner, events may be associated and/or credited to an appropriate viewer based on data related to the event (e.g., genre, channel, app, etc.). In some examples, the viewer modeler 306 determines that a particular device in a household is credited to a user based on viewing characteristics and demographics of a matching panelist (e.g., the panelist and the user have similar demographics and/or viewing characteristics).

Once the viewer modeler 306 determines the demographic model, the demographic corrector 308 corrects demographic data for a household with missing and/or incorrect household demographic data. For example, the viewer modeler 306 determines that a household has unidentified children, the demographic corrector 308 will add the unidentified children to the household data, as well as demographics associated with the children. In some examples, the viewer modeler 306 and demographic corrector 308 may obtain and adjust household data prior to and/or after receiving an event. Alternatively, the demographic corrector 308 may adjust household demographic data for each received event, if a mismatch exists.

In the illustrated example of FIG. 3, the event creditor 310 credits the received event based on the updated household data and the viewer assignment model. The updated household data may identify a number of users (e.g., 3) of an OTT device in a household. The event creditor 310 may determine which user, or which combination of the possible household users, actually viewed the received event based on the panelist data. In this manner, the event creditor 310 credits the event to the appropriate users based on the updated household data and the viewer assignment model. In some examples, the event creditor 310 determines whether or not to credit an event based on crediting rules. Since the received event is based on data received directly from the OTT database 112, the crediting rules can be very specific. For example, an event may be credited when the first frame is viewed, when a first frame is fully rendered, when an event is replayed after a previous completion, after a threshold amount of time has passed during a resume after a pause, etc. Additionally, the event creditor 310 may credit the event based on details including total viewing time, total seconds recorded, resume time after pause, buffering time, advertising time, auto-play data, etc. The granularity of the crediting and/or event credit rules can be adjusted based on the preferences of a user and/or administrator. For example, the event creditor 310 may determine how many seconds an event was viewed by a user of the household excluding buffering time.

Once the event has been credited by the event creditor 310, the example demographic aggregator 312 may determine audience measurement data for demographic aggregations including a unique audience for different demographic groups and/or various totals (e.g., total video starts, total viewed duration, total viewed ad duration, total ad count, etc.) based on the credited events. Additionally or alternatively, the demographic aggregator 312 may receive the example hierarchy control file 210 from the AME server 108. The hierarchy control file 210 may inform the demographic aggregator 312 how to aggregate audience measurement data associated with the event based on AME settings. In this manner, the demographic aggregator may determine a unique audience based on brands and/or sub-brands. The demographic aggregator 312 transmits the audience measurement data including the demographic aggregations control file 214 to the AME server 108 for further processing, as further described in FIG. 4.

Figure 4:
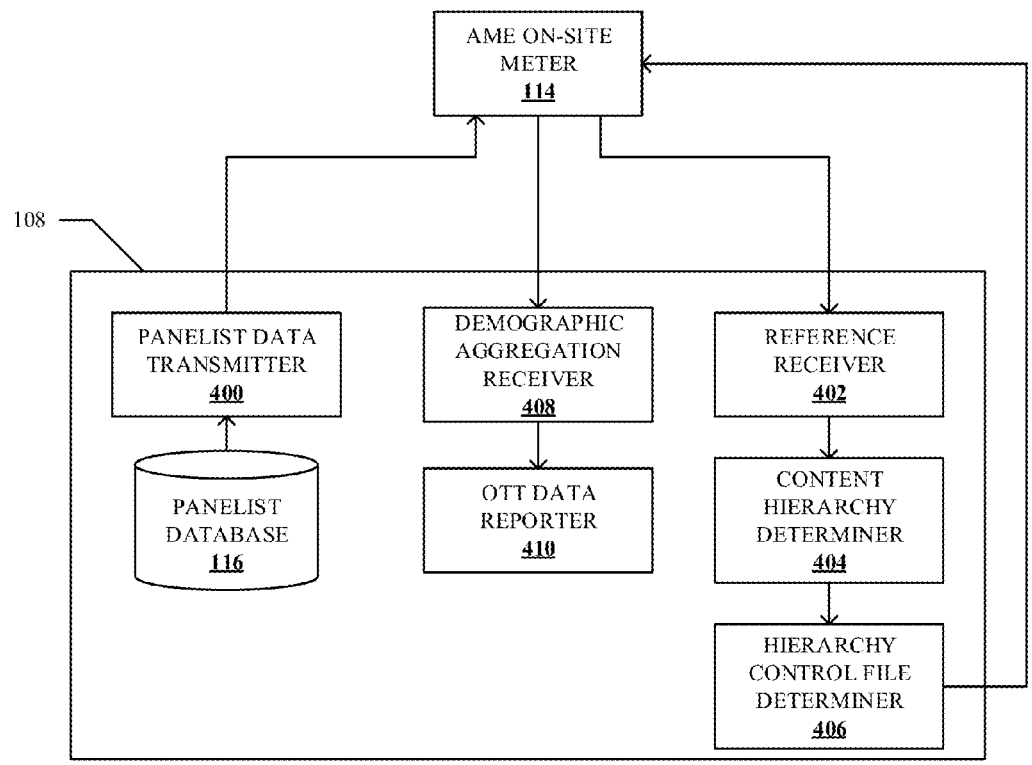
FIG. 4 illustrates an example block diagram of the AME server of FIG. 1.

FIG. 4 is an illustration of the example AME server 108 in communication with the example AME on-site meter 114 of FIGS. 1-3. The AME server 108 includes an example panelist data transmitter 400, an example reference receiver 402, an example content hierarchy determiner 404, an example hierarchy control file determiner 406, an example demographic aggregation receiver 408, an example OTT data reported 410, and the example panelist database 116 of FIG. 1.

In the illustration of FIG. 4, the example panelist data transmitter 400 transmits panelist data (e.g., the panelist data 204 of FIG. 2-3) from the example panelist database 116 to the AME on-site meter 114. As previously described in FIG. 3, the panelist data is used to create demographic and viewer assignment models to adjust household data from an OTT service provider and determine audience measurement data based on a received media event.

The example reference receiver 402 receives the daily volumetric file 208 and the hourly reference file 210 from volumetric/reference generator 302 of FIG. 3. As previously described, the example daily volumetric file 208 may include metadata (e.g., channel, program, episode, etc.) and metrics (e.g., video starts, durations, etc.) from events collected by the OTT database 112 during a 24-hour period. The example hourly reference file 210 is a subset of the daily volumetric file 208 including the metadata from events collected by the OTT database 112 during an hour period.

The example content hierarchy determiner 404 builds a content hierarchy based on the received daily volumetric file 208 and the hourly reference file 210. The content hierarchy is based on AME data related to how device level viewing events 206 relate to brands. For example, an AME may determine, based on raw data of a particular event, that the event is owned by a particular company. In this manner, the AME can further aggregate events based on companies that own and/or produce the events. Additionally, the content hierarchy may be used to resolve anomalies, provide logical nesting points for aggregation and reporting, and link content across multiple points of distribution. For example, the content hierarchy may be used to determine a same episode available in different channels.

Once the content hierarchy has been created, the example hierarchy control file determiner 406 determines a hierarchy control file (e.g., the hierarchy control file 212 of FIG. 2). Through the creation of the hierarchy control file 212, the content hierarchy control file determiner 406 determines the scope of content for which audience measurement data is to be reported for a day. As previously described, the hierarchy control file 212 is determined at the brand and/or sub-brand level. Additionally, the determination of the hierarchy control file may allow for corrections in the content hierarchy for unification (e.g., when the event may have been shown through multiple different applications and/or websites) within each brand and/or sub-brand. The hierarchy control file is transmitted to the AME on-site meter 114 to prompt unique audience calculations at different levels in the hierarchy.

In the illustration of FIG. 4, the demographic aggregation receiver 408 receives the demographic aggregations control file 214 from the demographic aggregator 312 of FIG. 3. In some examples, the aggregations may be a unique audience based on updated household demographics and the created hierarchy control file 212. Once the demographic aggregations are received by the demographic aggregation receiver 408, the OTT data reporter 410 may generate a report based on the determined aggregations. In some examples, the OTT data reporter 410 may generate reports regarding various audience measurement data including the household data from an OTT service provider, panelist data, data relating to an OTT event, data relating to missing demographics form the household data, etc. In some examples, the OTT reporter 410 may calibrate the household data from the OTT database 112 based on the received aggregations and/or audience measurement data.

FIG. 5 illustrates an example panel matching process performed by the example viewer modeler 306 of FIG. 3 to generate the demographic model and/or the viewer assignment model. The process utilizes example panel (e.g., an NPM panel) data 500 from panelists associated with the panelist database 116, an example universe of OTT user profiles 502 (e.g., associated with the OTT service provider server 106, such as Apple™) from the OTT database 112, and a merged dataset based on the panel data 500 and the universe of OTT user profiles 502. The example panel data 500 includes example panelist data 506 associated with users whose households include an OTT device and example data 504 associated with users whose household do not include an OTT device. The example universe of OTT user profiles 502 includes example user profiles 508 associated with users whose households includes an OTT device, example user profiles 510 associated with users whose households do not include an OTT device (e.g., where the user profiles are associated with other products (iTunes, iPod, iPhone, etc.) of the OTT service provider other than an OTT device), and example data 512 associated with users whose households include an OTT device associated with a captured event (e.g., from the device level viewing events 206).

As previously described in FIG. 3, the viewer modeler 306 receives the example panel data 500 from the AME server 108 and the universe of OTT user profiles 502 from the OTT database 112. In the illustrated example, both the panel data 500 and the universe of OTT user profiles 502 include respective personal identification information (PII) that is encrypted (e.g., salted and encrypted using Iron Key™) by their respective providers (e.g., AME vs. ORR service provider) to preserve the confidentiality of the panelists and the OTT users (e.g., corresponding to double-blind encryption). The viewer modeler 306 may compare the encrypted PII in the panel data 500 and the encrypted PII in the OTT user profiles 502, and combine the panel data 500 and OTT user profiles 502 having matching encrypted PII to create the merged dataset 514 to determine a demographic and viewer assignment models. For example, the demographic assignment model may merge demographic data from the panel data 500 with demographic data from the household data (e.g., any of the user OTT profiles 502) having matching, encrypted PII. In some examples, such an example merged dataset 514 may contain a direct matching for an OTT user represented in the user profiles 508 with a panelist represented in the panelist data 506. In some examples, a direct matching is based on a match of encrypted name and/or address PII, encrypted longitude and latitude address PII, etc.

For example, the viewer modeler 306 may determine when an OTT user from the universe of OTT user profiles 502 is a panelist from the panel data 500 based on a name, address, and/or geographic location (e.g., latitude and longitude). In some such examples, an OTT service provider encrypts the name, address, and/or geographic location PII for OTT user(s) represented in household data of an OTT device and an AME encrypts the name, address, and/or geographic location PII for panelist(s) represented in panelist data for a household using the same encryption. By comparing this encrypted PII, the AME on-site meter 114 can determine whether the OTT household data matches panelist data without actually identifying the panelist or the household. Based on a match, the viewer modeler 306 can determine any missing or inaccurate information (e.g., including missing persons) in a user profile of the OTT user. In some examples, the merged dataset 514 may contain indirect (e.g., predicted) matching for an OTT user with a panelist (e.g., when an OTT user is not a panelist, data from one or more panelists having similar demographics and/or viewing characteristics may be used to augment the demographic data for this OTT user). For example, the merged dataset 514 may match a panelist from the panel 500 with an OTT user associated with a captured event based on similar demographics, viewed content, etc. In this manner, the viewer modeler 306 can predict missing or inaccurate information (e.g., including missing persons) in an OTT user profile. In some examples, the viewer modeler 306 may include multiple nested or extended states of demographic prediction. For example, the viewer modeler 306 may determine a household size, and then use the household size as an input to a second model that may determine demographic data (e.g., age, gender, etc.) based on the household size. In some examples, the viewer modeler 306 may determining missing and/or inaccurate demographic data for a household based on non-OTT device data associated with the household (e.g., number of registered MP3 players, number of registered tablets, number of registered media service providers, etc.)

The example merged dataset 514 of FIG. 5 may also include a viewer assignment model. Viewer assignment data may not be available in household data. By leveraging viewing data from the demographic assignment model, the viewer modeler 306 can obtain viewing data related to a matched panelist to determine a viewer assignment model based on media impression data. For example, a 2 person household may be panelists in a panel. The demographics for each person are used to develop the demographic assignment model, and the viewing characteristics for each person are used to develop the viewer assignment model. In such an example, the viewer assignment model may determine that in the 2 person household, an event associated with a comedy is viewed by a male in the household 75% of the time and viewed by a female 60% of the time. In this manner, the viewer assignment model may determine that for every 100 events related to comedy from a 2 person household (e.g., 1 male and 1 female), the male is responsible for 75 of the 100 events and the women is responsible for 60 of the 100 events. Thus, the viewer assignment model can determine which user(s) in a particular household are responsible for viewing an anonymized event. Although the above example is associated to a household with 1 male and 1 female, more complicated combinations (e.g., based on any combination of gender, age, income, location, etc.) may be used to determine the viewer assignment model. In this manner, the viewer modeler 306 can accurately credit events to the appropriate user of a household based on the viewer assignment model.

FIG. 6A-K are examples of the data that may be communicated between the OTT service provider 106, the AME on-site meter 114, and the AME server 108 as previously described in FIG. 2. FIGS. 6A-C are examples of the household characteristics 200, FIG. 6D is an example of the device to household mapping 202, FIG. 6E is an example of a device level viewing event 206, FIG. 6F is an example of the daily volumetric file 208, FIG. 6G is an example of the hourly reference file 210, FIG. 6H is an example of the content hierarchy control file 212, and FIG. 6I is an example of demographic aggregations control file 214, and FIG. 6J-K are example demographic aggregation outputs.

The illustrated examples of FIGS. 6A-C represent three different examples of household characteristics 600, 602, and 604. In some examples, a combination of the example household characteristics 600, 602, 604 may be used by the AME on-site meter 114 to create a viewer assignment model. For example, the household characteristics 600 of FIG. 6A includes a household ID, a device count, a person count, an income count, a presence of children, and a designated market area. FIG. 6B displays example basic person characteristics 602 (e.g., demographics) that may be used by the AME on-site meter 114 to create a viewer assignment model based on a mapping of persons to a household. The example basic person characteristics 602 of FIG. 6B include a household ID, a person ID, an age, a gender, a race, and an option for Hispanic or not. FIG. 6C displays data from basic example events 604 for an OTT device that may be used by the AME on-site meter 114 to create a viewer assignment model an event data match. The data of the example events 604 of FIG. 6C includes a device ID, seven day content genres, seven day daypart (e.g., the part of the day when the events are received), and seven day total minutes. In some examples the household characteristics may include a combination of the household characteristics 600, the basic person characteristics 602, and the basic events 604.

FIG. 6D is an example illustration of a device-to-household mapping 202. As previously described, the device-to-household mapping 202 data is used to map events from various devices to a household. The device-to-household mapping 202 may be pre-mapped to events or independently provided to the AME on-site meter 114 for aggregation. The device-to-household mapping 202 of FIG. 6D includes a device ID, a hashed ID, and a location (e.g., location within the household in which the OTT device is located). In the example device-to-household mapping 202 of FIG. 6D the location of the OTT devices are in the bedroom and the living room of the example household.

FIG. 6E is an example illustration of device level viewing events 206 data. As previously described, the device level viewing event 206 data is related to a captured event from an OTT service provider server 106. The device level viewing event 206 data is used by the AME on-site meter 114 to create reference and volumetric files as well as determine the demographic and viewer assignment models. The example device level viewing event 206 data includes a device ID, an Apple ID (e.g., or, more generally, a user profile ID for the OTT user), an application and/or site name, an application version, a video URL, a channel name, an episode title, a content ID, a custom field 1, a custom field 2, an asset length (e.g. a length of the episode in seconds), a designated market area, a country code, a content view duration, an ad viewed duration (e.g., in seconds), an event collection time (e.g., a time when the event was collected), a number of viewed ads, an IP address, and a genre. According to this example, a received viewing event was from device '01' of user 'ax185e.' The user used application "Watch ABC" version "X.X." to watch "season 1 episode 1" of the "1800 second" long show entitled "Scandal," which is a "primetime" show. The user was located in the "501" designated market area in the "US" for "300" seconds. In some examples, if a particular field is empty (e.g., number of ads within the collected segment), then there may be no data for this field (e.g., due to no available data and/or an error).

FIG. 6F is an example illustration of the daily volumetric file 208. As previously described, the daily volumetric file 208 is a summary of the events collect at the event level. The example daily volumetric file 208 includes a data date, a collection date, an application and/or site name, a program name, a channel name and/or ID, an episode title, a content ID, a custom field 1, a custom field 2, an asset length, a designated market area, a country code, a content viewed duration, and a number of viewed ads. The example daily volumetric file 208 of FIG. 6F may only be part of the total daily volumetric file 208. For example, the example daily volumetric file 208 of FIG. 6F is based on a daily volumetric file for the event received in FIG. 6G. In this example, the event was collected between 6 AM on May 21 to 6 AM and May 22. In some examples, the daily volumetric file 208 may contain a plurality of events obtained within the collection date.

FIG. 6G is an example illustration of the hourly reference file 210 of FIG. 2. As previously described, the hourly reference file 208 is a subset of the daily volumetric file 208 based on the metadata of a received event which is transmitted to the AME server 108 hourly. The example hourly reference file 208 includes a data date, a an application and/or site name, a program name, a channel name and/or ID, an episode title, a content ID, a custom field 1, a custom field 2, and an asset length. The example hourly reference file 208 is transmitted to the AME server 108 to identify new content and/or a change in hierarchy and/or attributes.

FIG. 6H is an example of the hierarchy control file 212 of FIG. 2. As previously described, the hierarchy control file 212 is generated at the AME server 108 to prompt unique audience calculations at different levels in the hierarchy. In some examples, the hierarchy control file 212 aligns aggregation frequencies, so that there will be one file for daily aggregation, one for weekly aggregation, etc. The example hierarchy control file 212 includes a content ID, a channel, a brand, a sub-brand, a program, and an episode. The content ID and the channel of the example hierarchy control file 212 are based on retrieved an hourly reference file 210. In this example, the hierarchy control file 212 is based on the content ID "SB_1011" from Channel "Nick." The "Nick" Channel is associated with the "Viacom" brand and the "Nickelodeon" sub-brand.

FIG. 6I is an example demographic aggregations control file 214 specifying example demographic aggregations at various levels. The demographic aggregations control file 214 can specify unique audiences at multiple levels. In some examples, the content hierarchy control file 212 is included in, or otherwise used to construct, the example demographic aggregations control file 214 to determine rollups while the demographic and view assignment models are used for the aggregations. FIG. 6I includes aggregation types 606 for various audience measurement categories 608. The aggregation types 606 are aggregations at the specified level. For example, the aggregation type "brand× country× subbrand× program" corresponds to aggregations at the brand, country, sub brand, and program level. An "x" represents an aggregation parameter (e.g., each unique value within the dimension will generate a new aggregation). An "ALL" represents a collapse point (e.g., all unique values within the dimension will be collapsed into one, and thus will not trigger new aggregations).

FIGS. 6J-K is an example output of a demographic aggregations control file 214 at various levels. FIGS. 6J-K include an aggregation ID (e.g., for an aggregation type), a period (e.g., hourly, daily, weekly, monthly, etc.), a channel, a brand, a sub-brand, a program, an episode, a content ID, a segment-B (e.g. a customizable group), a segment-C (e.g. a customizable group), a country, a designated market area, an age, a gender, a total amount of video starts, a unique audience, a total viewed duration, a total viewed ad duration, and a total ad count. In the example of FIGS. 6J-K, there are 7,650 18-year old males in the 501 designated market area who viewed Survivor on CBS daily on an OTT device.

While example manners of implementing the example AME server 108 and the example AME on-site meter 114 of FIG. 1 are illustrated in FIGS. 3 and 4, elements, processes and/or devices illustrated in FIGS. 3 and 4 may be combined, divided, re-arranged, omitted, eliminated and/or implemented in any other way. Further, the example event receiver 300, the example volumetric/reference generator 302, the example household data determiner 304, the example viewer modeler 306, the example demographic corrector 308, the example event creditor 310, the example demographic aggregator 312, and/or, more generally, the example AME server 108 of FIG. 3, and/or the example panelist transmitter 400, the example reference receiver 402, the example content hierarchy determiner 404, the example hierarchy control file determiner 406, the example demographic aggregation receiver 408, the example OTT data reporter, and/or, more generally, the example AME server 108 of FIG. 4 may be implemented by hardware, machine readable instructions, software, firmware and/or any combination of hardware, machine readable instructions, software and/or firmware. Thus, for example, any of the example event receiver 300, the example volumetric/reference generator 302, the example household data determiner 304, the example viewer modeler 306, the example demographic corrector 308, the example event creditor 310, the example demographic aggregator 312, and/or, more generally, the example AME server 108 of FIG. 3, and/or the example panelist transmitter 400, the example reference receiver 402, the example content hierarchy determiner 404, the example hierarchy control file determiner 406, the example demographic aggregation receiver 408, the example OTT data reporter, and/or, more generally, the example AME server 108 of FIG. 4 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example event receiver 300, the example volumetric/reference generator 302, the example household data determiner 304, the example viewer modeler 306, the example demographic corrector 308, the example event creditor 310, the example demographic aggregator 312, and/or, more generally, the example AME server 108 of FIG. 3, and/or the example panelist transmitter 400, the example reference receiver 402, the example content hierarchy determiner 404, the example hierarchy control file determiner 406, the example demographic aggregation receiver 408, the example OTT data reporter, and/or, more generally, the example AME server 108 of FIG. 4 is/are hereby expressly defined to include a tangible computer readable storage device or storage disk such as a memory, a digital versatile disk (DVD), a compact disk (CD), a Blu-ray disk, etc. storing the software and/or firmware. Further still, the example AME server 108 of FIG. 3 and/or the example AME on-site meter 114 of FIG. 4 include elements, processes and/or devices in addition to, or instead of, those illustrated in FIGS. 7-9, and/or may include more than one of any or all of the illustrated elements, processes and devices.

Figure 7:
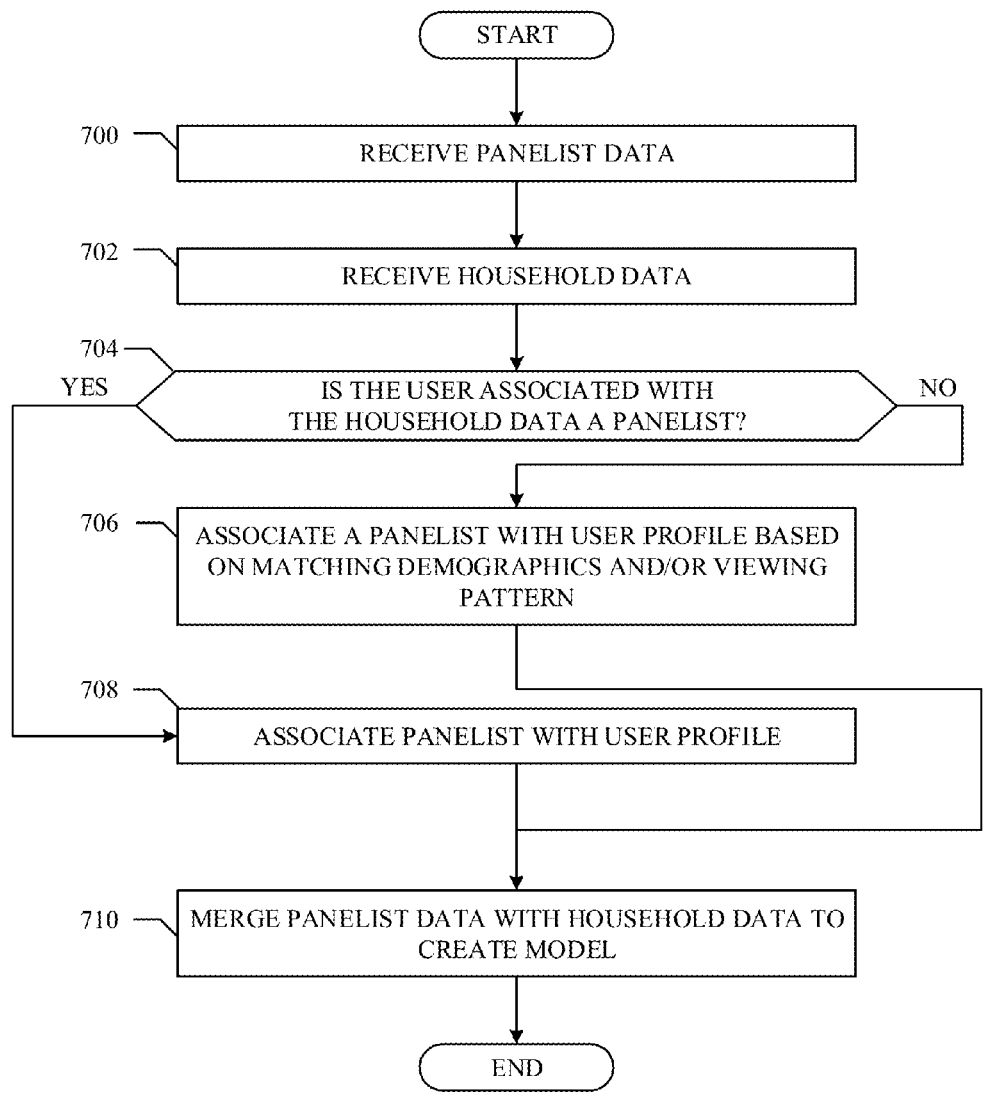
FIGS. 7-9 are flowcharts representative of example machine readable instructions that may be executed to implement the example AME on-site meter and/or the example AME server of FIG. 1.
Figure 8:
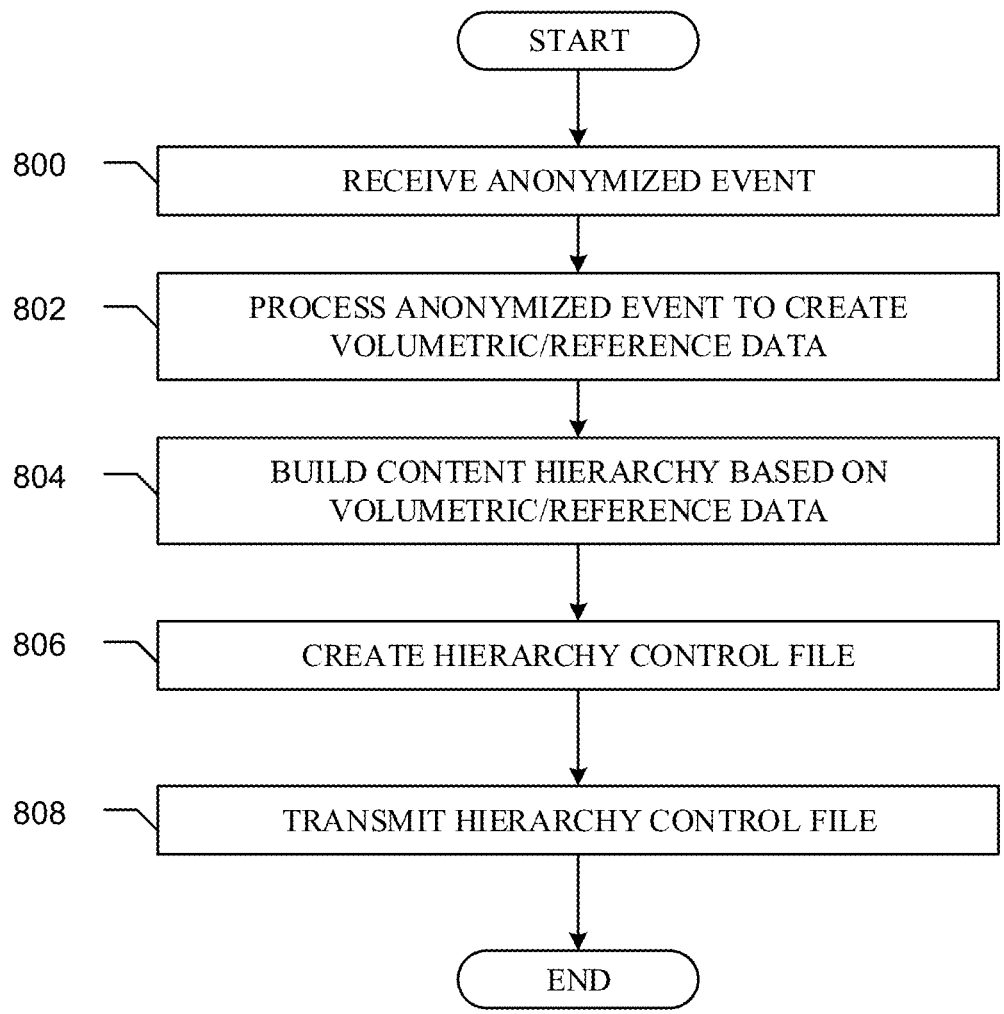
Figure 9:
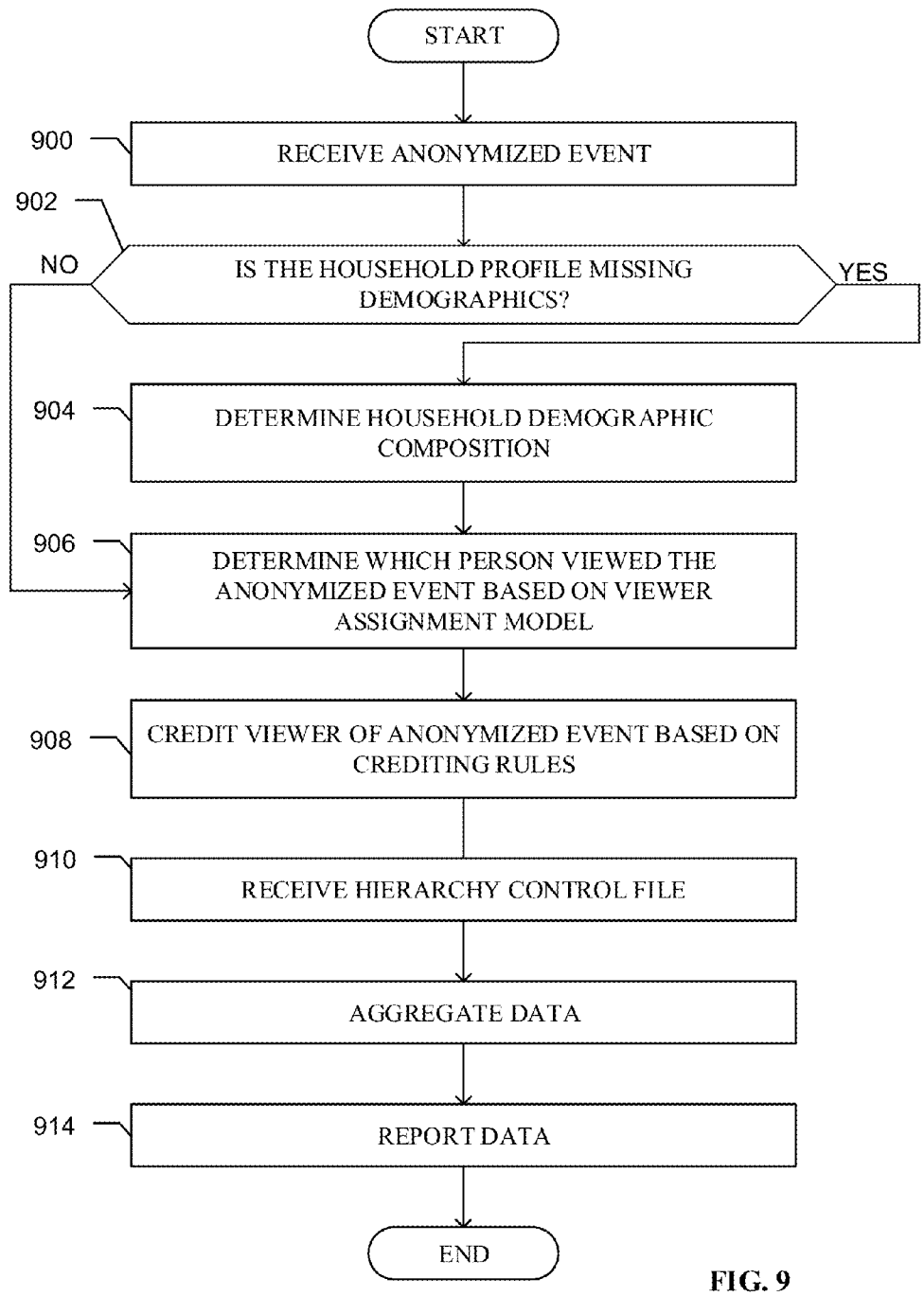

Flowcharts representative of example machine readable instructions for implementing the example AME server 108 and/or the example AME on-site meter 114 are shown in FIGS. 7-9. In the examples, the machine readable instructions comprise a program for execution by a processor such as the processor 1012, 1112 shown in the example processor platform 1000, 1100 discussed below in connection with FIGS. 10 and 11. The program may be embodied in machine readable instructions stored on a tangible computer readable storage medium such as a CD-ROM, a floppy disk, a hard drive, a digital versatile disk (DVD), a Blu-ray disk, or a memory associated with the processor 1012, 1112, but the entire program and/or parts thereof could alternatively be executed by a device other than the processor 1012, 1112 and/or embodied in firmware or dedicated hardware. Further, although the example program is described with reference to the flowcharts illustrated in FIGS. 7-9, many other methods of implementing the example AME server 108 and/or the example AME on-site meter 114 of FIG. 1 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 7-9 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 7 is a flowchart representative of example machine readable instructions that may be executed to implement the AME on-site meter 114 to merge household data from an OTT service provider with panelist data from an AME. Although the flowchart of FIG. 7 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

Turning to FIG. 7, at block 700, the example viewer modeler 306 receives panelist data 204 from the example panelist data transmitter 400 of the AME server 108. As previously described, the panelist data includes detailed demographics and viewing characteristics of panelists from a panel (e.g., NPM panel). In order to preserve confidentiality, PII of the panelist data 204 may be encrypted (e.g., hashed) so that the example OTT service provider server 106 will not be able to identify panelists. In some examples, the encrypted PII for a given household represented in the panelist data may include a panelist id(s), name(s), an address of the household, a longitude and/or latitude of the household, etc.

At block 702, the example viewer modeler 306 receives OTT household data from the example household data determiner 304. In some examples, the household data may be sent from the OTT database 112 with an anonymized event. Alternatively, the example viewer modeler 306 may receive the household data prior to the AME on-site meter 114 receiving an anonymized event. As previously described, the household data contains data associated with a household associated with an OTT device (e.g., user entered data gathered during registration). In order to preserve confidentiality of persons within households, the PII for respective OTT users represented in the household data may be encrypted (e.g., hashed) by the OTT service provider using the same encryption method as used by the example AME server 108. In some examples, the encrypted PII for a given OTT household represented in the OTT household data may include a household id, a name, an address, a longitude and/or latitude of the household, etc. In this manner, the encrypted PII for a panelist household represented in the panelist data and the encrypted PII for an OTT household represented in the OTT household data will match if panelist household matches the OTT household.

At block 704, the example viewer modeler 306 matches the encrypted PII in panelist data with the encrypted PII in household data to identify OTT the user(s) associated with the OTT household data who are panelists who are also panelists associated with the panelist data (e.g., based on a match of the encrypted panelist PII data and the encrypted OTT household PII data). If the panelist data and the household data match, the viewer modeler 306 associates the user associated with the OTT household data with data from a matching panelist (e.g., based on matching PII) (block 708). If the example viewer modeler 306 determines that a given user associated with the OTT household data is not a panelist, the viewer modeler 306 may associate panelist data from one or more panelists whose demographics and/or viewing characteristics match demographics and/or viewing characteristics of persons in the household (block 706). For example, if a household is located in an affluent (e.g., high income) suburb and the OTT household viewing characteristics include an OTT application associated with teenage girls, the example viewer modeler 306 may associate the OTT household with panelist data from one or more high income panelists whose viewing characteristics include OTT applications associated with teenage girls. Once the example viewer modeler 306 has associated the panelist data from one or more panelists with the OTT household data, the viewer modeler 306 merges the panelist data with the OTT household data to create and/or update the demographic assignment model (block 710).

FIG. 8 is a flowchart representative of example machine readable instructions that may be executed to implement the AME on-site meter 114 and the AME server 108 to create a hierarchy control file used to aggregate audience measurement data. Although the flowchart of FIG. 8 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

Turning to FIG. 8, at block 800, the example event receiver 300 receives an anonymized (e.g., encrypted) event (e.g., media impression from an OTT device) from the OTT database 112. The anonymized event may include data related to the event (e.g., device level viewing events 206) as well as household data (e.g., household characteristics 200) as previously described in FIGS. 2, 6A-6C, and 6E. In some example, the OTT service provider server 106 may only encrypt PII data (e.g., name(s), address, longitude and latitude, etc.) associated with the anonymized event (e.g., the OTT service provider server 106 may not encrypt non PII data including demographics and/or device level viewing events 206).

At block 802, the example volumetric/reference generator 302 processes the anonymized event to create the daily volumetric file 208 and/or the hourly reference file 210 of FIGS. 2 and 6F-6G. The AME on-site meter 114 transmits the daily volumetric file 208 to the AME server 108 daily, or at any other appropriate interval. The AME on-site meter 114 transmits the hourly reference file 210 and/or the daily volumetric file 208 to the example reference receiver 402 of the AME server 108 hourly, or at any other appropriate interval. At block 804, the example content hierarchy determiner 404 determines a content hierarchy based on the received hourly reference file 210 and/or the daily volumetric file 208. As previously described, the content hierarchy may be used to aggregate an episode available in different applications (e.g., so that an event is not credited twice when viewed in different OTT applications). Since brand data is not available in the event data, the content hierarchy may utilize data stored in the example AME server 108 to link events to brand and/or sub-brands.

At block 806, the example hierarchy control file determiner 406 determines a hierarchy control file based on the content hierarchy. The hierarchy control file determines which demographics to report based on the brand data in the content hierarchy (e.g., a unique audience for media related to Viacom™). The hierarchy control file may be determined based on user and/or administrator settings. Alternatively the hierarchy control file may be preset. Once the hierarchy control file has been determined, the hierarchy control file determiner 406 transmits the hierarchy content file to the AME on-site meter 114 for further processing (block 808).

FIG. 9 is a flowchart representative of example machine readable instructions that may be executed to implement the AME on-site meter 114 to determine and report audience measurement data. Although the flowchart of FIG. 9 depicts example steps in a given order, these steps are not exhaustive, various changes and modifications may be affected by one skilled in the art within the spirit and scope of the disclosure. For example, blocks illustrated in the flowchart may be performed in an alternative order or may be performed in parallel.

Turning to FIG. 9, at block 900, the example event receiver 300 receives an anonymized event from the OTT database 112. The event includes data related to media viewed on an OTT device in a given OTT household. In some examples, the event includes OTT household data for the OTT device. Once the anonymized event has been received, the example demographic corrector 308 determines if the OTT household data is missing demographics (e.g., one or more missing persons from the OTT household data associated with OTT device) based on a demographic assignment model generated by the example viewer modeler 306 (block 902). If the household data is not missing demographics, the example event creditor 310 determines which person likely viewed the anonymized event based on a viewer assignment model generated by the viewer modeler 306 (block 906).

However, if the household data is missing demographics, the example demographic corrector 308 determines household demographic composition based on the demographic assignment model (block 904). The demographic corrector 308 may determine that a particular person is missing from the household data, demographics associated with person(s) represented by the household data are missing, and/or demographics associated with the person(s) represented by the household data are inaccurate. The demographic corrector 308 adjusts the household data accordingly by updating the household data based on the demographics of the panelists. Process then proceeds to block 906.

As noted above, at block 906, the example event creditor 310 determines which person(s) likely viewed the anonymized event based on the viewer assignment model generated by the viewer modeler 306. For example, the event creditor 310 may determine that an anonymized event relating to sports should be credited to a 50 year old male of the household, because the viewer assignment model associates sports events to the 50 year old males. Once, the event creditor 310 has determined which person(s) viewed the anonymized event, the event creditor 310 credits the person(s) for the anonymized event based on crediting rules (block 908). As previously described, the crediting rules may include when the first frame is viewed, when a first frame is fully rendered, when an event is replayed after a previous completion, after a threshold amount of time has passed during a resume after a pause, etc.

At block 910, the demographic aggregator 312 receives the data associated with the credited anonymized event and the hierarchy control file generated at the AME server 108. At block 912, the demographic aggregator 312 aggregates audience measurement data based on the credited anonymized event and the hierarchy control file. As previously described, the hierarchy control file determines how the demographic aggregator 312 will aggregate the audience measurement data (e.g., which demographics and/or event data will be aggregated). Once the audience measurement data has been aggregated, it is transmitted to the example demographic aggregation receiver 408 of the AME server 108. At block 914, the OTT data reporter 410 generates a report based on the aggregated audience measurement data. As previously described, the report may include unique audiences broken up by brand, demographics, event data, etc.

Figure 10:
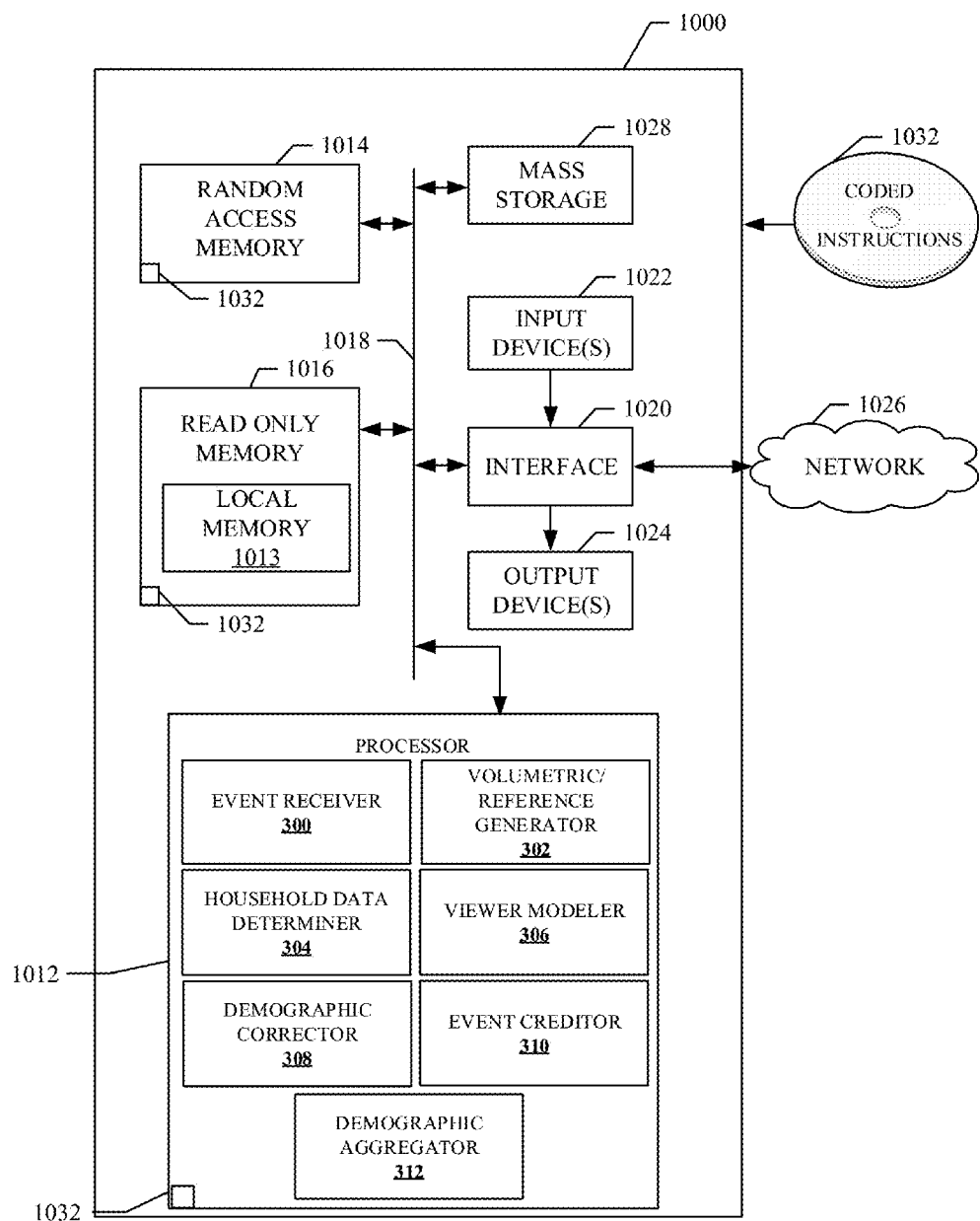
FIG. 10 is a block diagram of an example processor platform structured to execute the example instructions of FIGS. 7, 8 and/or 9 to implement the example AME on-site meter.

FIG. 10 is a block diagram of an example processor platform 1000 capable of executing the instructions of FIGS. 7, 8, and/or 9 to implement the example AME on-site meter 114 of FIGS. 1, 2, 3, and/or 4. The processor platform 1000 can be, for example, a server, a personal computer, a mobile device (e.g., a cell phone, a smart phone, a tablet such as an iPad™), a personal digital assistant (PDA), an Internet appliance, or any other type of computing device.

The processor platform 1000 of the illustrated example includes a processor 1012. The processor 1012 of the illustrated example is hardware. For example, the processor 1012 can be implemented by integrated circuits, logic circuits, microprocessors or controllers from any desired family or manufacturer.

The processor 1012 of the illustrated example includes a local memory 1013 (e.g., a cache). The example processor 1012 of FIG. 10 executes the instructions of FIGS. 7-9 to implement the example event receiver 300, the example volumetric/reference generator 302, the example household data determiner 304, the example viewer modeler 306, the example demographic corrector 308, the example event creditor 310, and/or the example demographic aggregator 312. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The coded instructions 1032 of FIGS. 7-9 may be stored in the mass storage device 1028, in the volatile memory 1014, in the non-volatile memory 1016, and/or on a removable tangible computer readable storage medium such as a CD or DVD.

Figure 11:
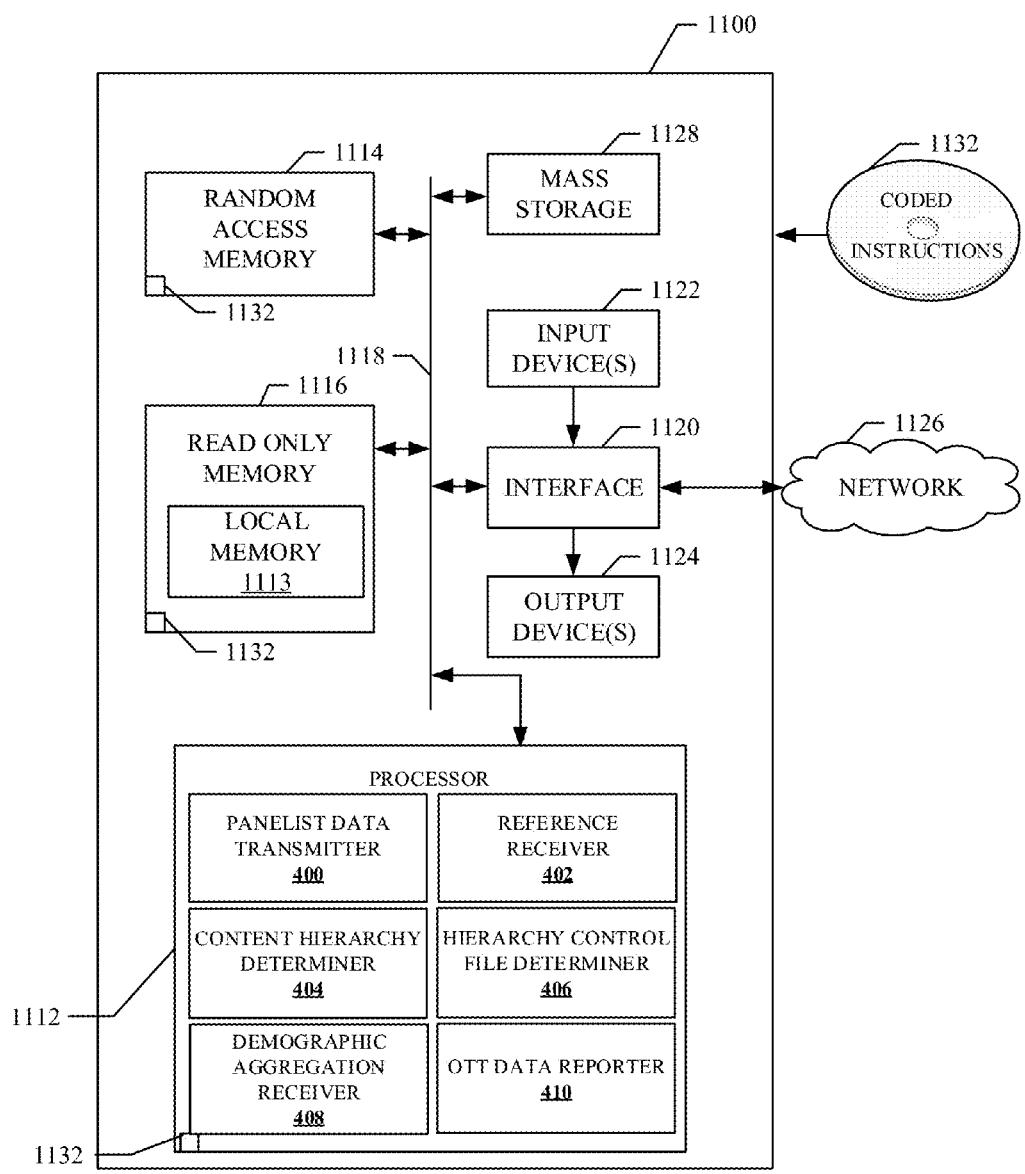
FIG. 11 is a block diagram of an example processor platform structured to execute the example instructions of FIGS. 7, 8 and/or 9 to implement the example AME server.

FIG. 11 is a block diagram of an example processor platform 1100 capable of executing the instructions of FIGS. 7, 8, and/or 9 to implement the example AME server 108 of FIGS. 1, 2, 3, and/or 4. The processor platform 1100 can be, for example, a server, a personal computer, a mobile device (e.g., a cell phone, a smart phone, a tablet such as an iPad™), a personal digital assistant (PDA), an Internet appliance, or any other type of computing device.

The processor platform 1100 of the illustrated example includes a processor 1112. The processor 1112 of the illustrated example is hardware. For example, the processor 1112 can be implemented by integrated circuits, logic circuits, microprocessors or controllers from any desired family or manufacturer.

The processor 1112 of the illustrated example includes a local memory 1113 (e.g., a cache). The example processor 1112 of FIG. 11 executes the instructions of FIGS. 7-9 to implement the example panelist data transmitter 400, the example reference receiver 402, the example content hierarchy determiner 404, the example hierarchy control file determiner 406, the example demographic aggregation receiver 408, and the example OTT data reporter 410. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7-9 may be stored in the mass storage device 1128, in the volatile memory 1114, in the non-volatile memory 1116, and/or on a removable tangible computer readable storage medium such as a CD or DVD.

From the foregoing, it will be appreciated that the above disclosed example methods, apparatus, and articles of manufacture determine audience measurement data for media accessed and/or presented by an OTT device. Using the examples disclosed herein, an AME on-site meter gathers household data from the OTT service provider and panelist data from an AME to determine demographic and viewer assignment models. In some examples, the AME on-site meter creates a hierarchy control file based on received anonymized events from an OTT service provider. In some examples, the AME on-site meter determines when users are missing from household data and adjusts the household data to include the missing users. In some examples, the AME on-site meter credits an event to a user of a household. In some examples, the AME generates reports based on audience measurement data including the hierarchy control file, the anonymized event, and the demographic and viewer assignment models.

Conventional techniques to determine OTT device audience measurement data include installing software on OTT devices to monitor audience measurement. However, OTT devices are not conducive to such software, and creating additional panels based on OTT devices can be costly. Example methods, apparatus, and articles of manufacture disclosed herein gather OTT event data directly from the OTT service provider and leverage AME panel data to augment inaccurate and/or missing demographics from household data associated with the OTT service provider. In this manner, the AME can accurately credit OTT events and determine audience measurement data for OTT devices at a lower cost.

Example methods are disclosed for over the top (OTT) media measurement. Such example methods include comparing, with a processor of an on-site meter in communication with an OTT service provider server, household data maintained by the OTT service provider server with anonymized panelist data provided by an audience measurement entity to identify a first person predicted to be included in a first household according to the anonymized panelist data but not included in the first household according to the household data. Such example also include accessing, with the processor of the on-site meter, media impressions collected by the OTT service provider server and corresponding to media accessed with a first OTT device associated with the first household. Such examples further include crediting, with the processor of the on-site meter, usage of the first OTT device associated with access of the media to the first person based on the media impressions and demographic data obtained from the anonymized panelist data and attributed to the first person.

In some examples, the household data corresponds to a user of the first OTT device associated with the first household, the user being registered to an OTT service provider associated with the OTT service provider server, the household data including at least one of demographic data associated with the user, an identifier associated with the first OTT device, an identifier associated with the user, or an identifier associated with the first household. In some examples, the panelist data corresponds to a second OTT device in a second household, the second household including at least one panelist associated with the audience measurement entity, the panelist data including at least one of demographic data associated with the second household or viewing characteristic data corresponding to the second OTT device.

In some examples, the comparing of the household data with the anonymized panelist data includes determining the first household matches the second household based on at least one of (A) a first similarity between the demographic data associated with the user registered to the OTT service provider and the demographic data associated with the second household or (B) a second similarity between the media impressions corresponding to the media accessed with the first OTT device and the viewing characteristic data corresponding to the second OTT device. In some examples, the crediting of the usage is further based on the determination of the first household matching the second household.

Some examples further include determining a viewer assignment model based on the viewing characteristic data, the viewer assignment model indicating a likelihood that the first person was exposed to a first one of the media impressions based on media impression data, the media impression data including at least one of an application name, a program name, a channel identifier, an episode title, or a genre. In some examples, the crediting of the usage of the first OTT device is based on the viewer assignment model.

In some examples, the crediting of the usage of the first OTT device is further based on crediting rules, the crediting rules including crediting the first OTT device for a first one of the media impressions based on at least one of a first frame of the first one of the media impressions being output by the OTT device, the first frame of the first one of the media impressions being fully rendered by the OTT device, the first one of the media impressions being replayed after a previous completion, a threshold amount of time being passed during a resume or after a pause of the first one of the media impressions, a total viewing time, a total seconds recorded, a total buffering time, or a total advertising time. In some examples, respective ones of the media impressions include at least one of a media identifier, a timestamp, a location, a duration of viewing, an application identifier, a program identifier, or a channel identifier.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

This patent claims priority from Indian Patent Application Serial Number 2734/DEL/2015, which was filed on Sep. 1, 2015, and is hereby incorporated by reference in its entirety.

What is claimed is:

1. A method for over the top (OTT) media measurement, the method comprising:
   accessing, by executing an instruction with a processor of an on-site meter, media impressions collected by an OTT service provider server and corresponding to media accessed with a first OTT device associated with a first household;
   comparing, by executing an instruction with the processor of the on-site meter in communication with the OTT service provider server, household data maintained by the OTT service provider server with anonymized panelist data provided by an audience measurement entity to identify a first person predicted to be included in the first household according to the anonymized panelist data but not included in the first household according to the household data, the comparing of the household data with the anonymized panelist data including determining that the first household matches a second household based on at least one of (A) a first similarity between demographic data associated with a user registered to an OTT service provider associated with the OTT service provider server and demographic data associated with the second household or (B) a second similarity between the media impressions corresponding to the media accessed with the first OTT device and viewing characteristic data corresponding to a second OTT device, the anonymized panelist data corresponding to the second OTT device in the second household; and crediting, by executing an instruction with the processor of the on-site meter, usage of the first OTT device associated with access of the media to the first person based on the media impressions and demographic data obtained from the anonymized panelist data and attributed to the first person.

2. The method of claim 1, wherein the household data corresponds to a user of the first OTT device associated with the first household, the user being registered to the OTT service provider associated with the OTT service provider server, the household data including at least one of the demographic data associated with the user, an identifier associated with the first OTT device, an identifier associated with the user, or an identifier associated with the first household.

3. The method of claim 2, wherein the second household includes at least one panelist associated with the audience measurement entity, the anonymized panelist data including at least one of the demographic data associated with the second household or the viewing characteristic data corresponding to the second OTT device.

4. The method of claim 3, further including determining a viewer assignment model based on the viewing characteristic data, the viewer assignment model indicating a likelihood that the first person was exposed to a first one of the media impressions based on media impression data, the media impression data including at least one of an application name, a program name, a channel identifier, an episode title, or a genre.

5. The method of claim 4, wherein the crediting of the usage of the first OTT device is based on the viewer assignment model.

6. The method of claim 1, wherein the crediting of the usage is further based on the determination of the first household matching the second household.

7. The method of claim 1, wherein respective ones of the media impressions include at least one of a media identifier, a timestamp, a location, a duration of viewing, an application identifier, a program identifier, or a channel identifier.

8. A method for over the top (OTT) media measurement, the method comprising:

comparing, by executing an instruction with a processor of an on-site meter in communication with an OTT service provider server, household data maintained by the OTT service provider server with anonymized panelist data provided by an audience measurement entity to identify a first person predicted to be included in a first household according to the anonymized panelist data but not included in the first household according to the household data;

accessing, by executing an instruction with the processor of the on-site meter, media impressions collected by the OTT service provider server and corresponding to media accessed with a first OTT device associated with the first household;

crediting, by executing an instruction with the processor of the on-site meter, usage of the first OTT device associated with access of the media to the first person based on the media impressions and demographic data obtained from the anonymized panelist data and attributed to the first person, the crediting of the usage of the first OTT device being based on crediting rules, the crediting rules including crediting the first OTT device for a first one of the media impressions based on at least one of a first frame of the first one of the media impressions being output by the OTT device, the first frame of the first one of the media impressions being fully rendered by the OTT device, the first one of the media impressions being replayed after a previous completion, a threshold amount of time being passed during a resume or after a pause of the first one of the media impressions, a total viewing time, a total seconds recorded, a total buffering time, or a total advertising time.

9. An apparatus for over the top (OTT) media measurement, the apparatus comprising:

a receiver to access media impressions collected by an OTT service provider server and corresponding to media accessed with a first OTT device associated with a first household;

a modeler to compare household data maintained by the OTT service provider server with anonymized panelist data provided by an audience measurement entity to identify a first person predicted to be included in the first household according to the anonymized panelist data but not included in the first household according to the household data, the modeler to compare the household data with the anonymized panelist data by determining that the first household matches a second household based on at least one of (A) a first similarity between demographic data associated with a user registered to a OTT service provider associated with the OTT service provider server and demographic data associated with the second household or (B) a second similarity between the media impressions corresponding to the media accessed with the first OTT device and viewing characteristic data corresponding to a second OTT device, the anonymized panelist data corresponding to the second OTT device in the second household; and a creditor to credit usage of the first OTT device associated with access of the media to the first person based on the media impressions and demographic data obtained from the anonymized panelist data and attributed to the first person.

10. The apparatus of claim 9, wherein the household data corresponds to a user of the first OTT device associated with the first household, the user being registered to the OTT service provider associated with the OTT service provider server, the household data including at least one of the demographic data associated with the user, an identifier associated with the first OTT device, an identifier associated with the user, or an identifier associated with the first household.

11. The apparatus of claim 10, wherein the second household includes at least one panelist associated with the audience measurement entity, the anonymized panelist data including at least one of demographic data associated with the second household or the viewing characteristic data corresponding to the second OTT device.

12. The apparatus of claim 11, wherein the modeler is to determine a viewer assignment model based on the viewing characteristic data, the viewer assignment model indicating a likelihood that the first person was exposed to a first one of the media impressions based on media impression data, the media impression data including at least one of an application name, a program name, a channel identifier, an episode title, or a genre.

13. The apparatus of claim 12, the creditor is to credit the usage of the first OTT device based on the viewer assignment model.

14. The apparatus of claim 9, wherein the creditor is further to credit the usage of the first OTT device based on the determination of the first household matching the second household.

15. The apparatus of claim 9, wherein respective ones of the media impressions include at least one of a media identifier, a timestamp, a location, a duration of viewing, an application identifier, a program identifier, or a channel identifier.

16. An apparatus for over the top (OTT) media measurement, the apparatus comprising:
   a modeler to compare household data maintained by an OTT service provider server with anonymized panelist data provided by an audience measurement entity to identify a first person predicted to be included in a first household according to the anonymized panelist data but not included in the first household according to the household data;
   a receiver to access media impressions collected by the OTT service provider server and corresponding to media accessed with a first OTT device associated with the first household;
   a creditor to credit usage of the first OTT device associated with access of the media to the first person based on the media impressions and demographic data obtained from the anonymized panelist data and attributed to the first person, the creditor to credit the usage of the first OTT device based on crediting rules, the crediting rules including crediting the first OTT device for a first one of the media impressions based on at least one of a first frame of the first one of the media impressions being output by the OTT device, the first frame of the first one of the media impressions being fully rendered by the OTT device, the first one of the media impressions being replayed after a previous completion, a threshold amount of time being passed during a resume or after a pause of the first one of the media impressions, a total viewing time, a total seconds recorded, a total buffering time, or a total advertising time.

17. A tangible computer readable storage medium comprising instructions that, when executed, cause a processor of an on-site meter to at least:
   access media impressions collected by an OTT service provider server and corresponding to media accessed with a first OTT device associated with a first household;
   compare household data maintained by the OTT service provider server with anonymized panelist data provided by an audience measurement entity to identify a first person predicted to be included in the first household according to the anonymized panelist data but not included in the first household according to the household data, the instructions to cause the processor to compare the household data with the anonymized panelist data by determining that the first household matches a second household based on at least one of (A) a first similarity between demographic data associated with a user registered to an OTT service provider associated with the OTT service provider server and demographic data associated with the second household or (B) a second similarity between the media impressions corresponding to the media accessed with the first OTT device and viewing characteristic data corresponding to a second OTT device, the anonymized panelist data corresponding to the second OTT device in the second household; and
   credit usage of the first OTT device associated with access of the media to the first person based on the media impressions and demographic data obtained from the anonymized panelist data and attributed to the first person.

18. A tangible computer readable storage medium comprising instructions that, when executed, cause a processor of an on-site meter to at least:
   compare household data maintained by an OTT service provider server with anonymized panelist data provided by an audience measurement entity to identify a first person predicted to be included in a first household according to the anonymized panelist data but not included in the first household according to the household data;
   access media impressions collected by the OTT service provider server and corresponding to media accessed with a first OTT device associated with the first household; and
   credit usage of the first OTT device associated with access of the media to the first person based on the media impressions and demographic data obtained from the anonymized panelist data and attributed to the first person, the instructions to cause the processor to credit the usage of the first OTT device based on crediting rules, the crediting rules including crediting the first OTT device for a first one of the media impressions based on at least one of a first frame of the first one of the media impressions being output by the OTT device, the first frame of the first one of the media impressions being fully rendered by the OTT device, the first one of the media impressions being replayed after a previous completion, a threshold amount of time being passed during a resume or after a pause of the first one of the media impressions, a total viewing time, a total seconds recorded, a total buffering time, or a total advertising time.

* * * * *